United States Patent [19]

Estes

[11] 4,093,960
[45] June 6, 1978

[54] TEST SIGNAL GENERATING SYSTEM AND METHOD

[75] Inventor: Earl M. Estes, Canon City, Colo.

[73] Assignee: American Technology Corporation, Canon City, Colo.

[21] Appl. No.: 677,196

[22] Filed: Apr. 15, 1976

Related U.S. Application Data

[63] Continuation of Ser. No. 523,775, Nov. 14, 1974, abandoned.

[51] Int. Cl.$^2$ .............................................. H04N 9/62
[52] U.S. Cl. ...................................... 358/10; 358/139
[58] Field of Search .................. 358/10, 139, DIG. 4; 328/187, 188, 189

[56] References Cited

U.S. PATENT DOCUMENTS

| | | | |
|---|---|---|---|
| 3,019,289 | 1/1962 | Machlis | 358/10 |
| 3,525,801 | 8/1970 | Willis | 358/10 |
| 3,559,092 | 1/1971 | Roth | 358/10 X |
| 3,582,544 | 6/1971 | Wlasuk | 328/188 X |
| 3,586,755 | 6/1971 | Wlasuk | 358/10 |
| 3,634,612 | 1/1972 | Stobbe | 358/10 |
| 3,879,749 | 4/1975 | Baum | 178/DIG. 4 |

*Primary Examiner*—Richard Murray
*Attorney, Agent, or Firm*—O'Rourke & Harris

[57] ABSTRACT

A test signal generating system and method is disclosed that is particularly well suited for servicing of television receivers and the like. A plurality of system outputs are produced that may be utilized to cause test patterns to be displayed on the image-producing device of a unit to be serviced, which test patterns are particularly useful in servicing TV receivers for checking and adjusting, if necessary, various characteristics such as linearity and pincushion distortion in scanning circuits, operation of electron beam convergence and/or color phasing and matrixing circuits where the TV receiver to be serviced is a color television receiver. The system is lightweight and portable yet produces a plurality of outputs to enhance out-of-shop servicing of TV receivers by providing greater capability without unduly complicating the same. To this end, the system employs a single rotary switch for output selection and utilizes digital circuitry. Test patterns caused to be produced include a uniform PRIMARY COLOR RASTER, COLOR BARS and VECTOR, 3.58 MHz MONITOR (for color sync oscillator), CROSSHATCH, HATCHDOTS and DOTS, with center marking being provided for CROSSHATCH, HATCHDOTS and DOTS patterns, and sixth bar color marking being provided for color bars patterns. The system also includes a single enabled oscillator to produce both the necessary offset carrier and a sweep frequency. A first hybrid modulus countdown chain is utilized to produce an offset carrier frequency with a predetermined relationship to the line frequency while maintaining phase lock between these two frequencies, and a second hybrid modulus countdown chain is utilized for count down from horizontal to vertical to produce the required number of lines per field. In addition, a high-level weighted matrix digital summing technique is utilized for producing a low-impedance system output.

37 Claims, 20 Drawing Figures

Fig_1

Fig._5

| TV VIDEO "TRUTH" TABLE ||||
|---|---|---|---|
| (X) | (Y) | (Z) | TV VIDEO |
| 0 | 0 | 0 | WHITE |
| 0 | 0 | 1 | LIGHT GRAY |
| 0 | 1 | 0 | DARK GRAY |
| 0 | 1 | 1 | BLACK |
| 1 | 0 | 0 | NOT USED |
| 1 | 0 | 1 | NOT USED |
| 1 | 1 | 0 | NOT USED |
| 1 | 1 | 0 | BLACKER-THAN BLACK (SYNC) |
*Fig_7*
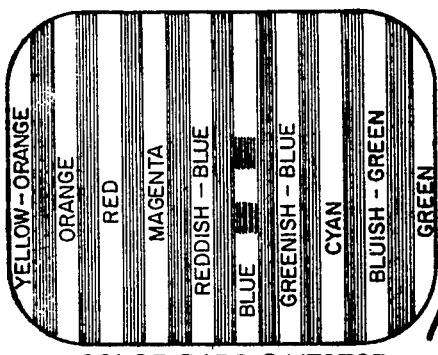
*Fig_9*
COLOR BARS & VECTOR
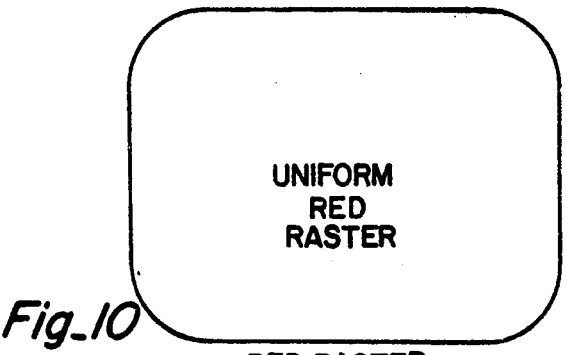
*Fig_10*
RED RASTER
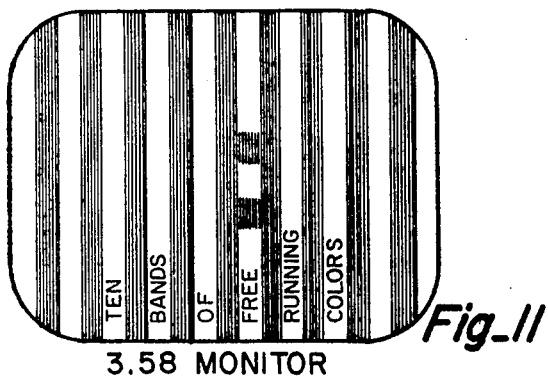
*Fig_11*
3.58 MONITOR
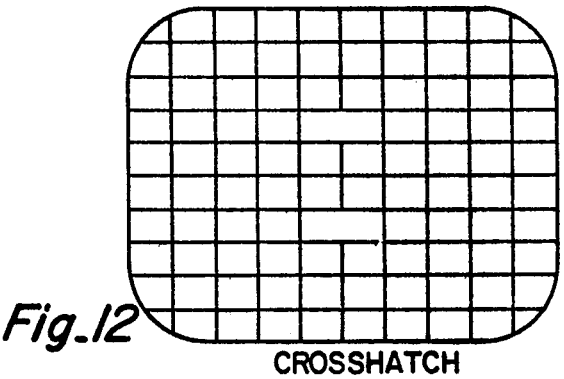
*Fig_12*
CROSSHATCH
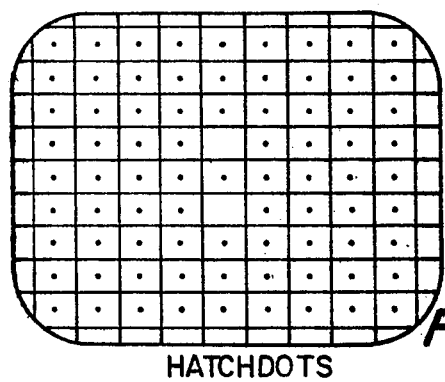
*Fig_13*
HATCHDOTS
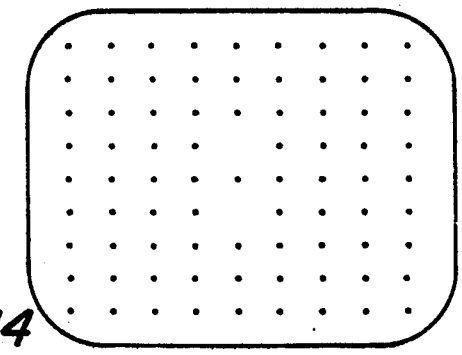
*Fig_14*
DOTS

| PATTERN SELECTION | SEGMENT | IC17 TERMINALS | | | | | | | | | | | TOTAL WEIGHT | VIDEO |
|---|---|---|---|---|---|---|---|---|---|---|---|---|---|---|
| | | 11 | 10 | 9 | 8 | 4 | 3 | 5 | 6 | 13 | 1 | 2 | 12 | | |
| | | | LINES & DOTS | | LINES & DOTS | | | H | H | | | V | V | | |
| ALL CONVERG | FP | 1 | 1 | 1 | 0 | 0 | 1 | 1 | 1 | 0 | 1 | 1 | 1 | 3 | BLACK |
| | SYNC | 0 | 1 | 1 | 1 | 0 | 1 | 1 | 1 | 0 | 1 | 1 | 1 | 6 | SYNC |
| | BP | 1 | 1 | 1 | 0 | 0 | 1 | 1 | 1 | 0 | 1 | 1 | 1 | 3 | BLACK |
| | SCAN | 1 | ⎍⎍ | 1 | ⎍⎍ | 1 | 1 | 1 | 0 | 1 | 1 | 1 | 0 | 0 & 3 | BLACK & WHITE |
| GRAY SCALE | FP | 1 | 1 | 1 | 0 | 0 | 1 | 0 | 1 | 0 | 1 | ⎍⎍ | 1 | 3 | BLACK |
| | SYNC | 0 | 1 | 1 | 1 | 0 | 1 | ⎍ | 1 | 0 | 1 | ⎍⎍ | 1 | 6 | SYNC |
| | BP | 1 | 1 | 1 | 0 | 0 | 1 | 1 | 1 | 0 | 1 | ⎍⎍ | 1 | 3 | BLACK |
| | SCAN | 1 | 1 | 1 | 0 | 1 | 1 | ⎍⎍ | ⎍⎍ | 1 | 1 | ⎍⎍ | ⎍⎍ | 0,1,2, & 3 | WHITE, LIGHT GRAY, DARK GRAY, BLACK |
| RED RASTER | FP | 1 | 1 | 1 | 0 | 0 | 1 | 1 | 1 | 0 | 0 | 1 | 1 | 3 | BLACK |
| | SYNC | 0 | 1 | 1 | 1 | 0 | 1 | 1 | 1 | 0 | 0 | 1 | 1 | 6 | SYNC |
| | BP | 1 | 1 | 1 | 0 | 1 | 1 | 1 | 0 | 0 | 0 | 1 | 1 | 2 | DARK GRAY |
| | SCAN | 1 | 1 | 1 | 0 | 1 | 1 | 1 | 0 | 1 | 0 | 1 | 1 | 2 | DARK GRAY |
| 3.58 MONITOR | SYNC-1 | 0 | 1 | 1 | 1 | 0 | 0 | 1 | 1 | 0 | 0 | 1 | 1 | 6 | SYNC |
| | SYNC-2 | 0 | 1 | 1 | 1 | 0 | 0 | 1 | 1 | 0 | 0 | 1 | 1 | 6 | SYNC |
| | SYNC-3 | 0 | 1 | 1 | 1 | 0 | 0 | 1 | 1 | 0 | 0 | 1 | 1 | 6 | SYNC |
| | SCAN | 1 | 1 | 1 | 0 | 1 | 0 | 1 | 1 | 1 | 0 | 1 | 1 | 3 | BLACK |
| COLOR BARS | FP | 1 | 1 | 1 | 0 | 0 | 1 | 0 | 1 | 0 | 0 | ⎍⎍ | 1 | 3 | BLACK |
| | SYNC | 0 | 1 | 1 | 1 | 0 | 1 | ⎍ | 1 | 0 | 0 | ⎍⎍ | 1 | 6 | SYNC |
| | BP | 1 | 1 | 1 | 0 | 1 | 1 | 1 | 0 | 0 | 0 | ⎍⎍ | 1 | 2 | DARK GRAY |
| | SCAN | 1 | 1 | 1 | 0 | 1 | 1 | ⎍⎍ | ⎍⎍ | 1 | 0 | ⎍⎍ | 1 | 2 & 3 | DARK GRAY & BLACK |
| VECTOR | FP | 1 | 1 | 1 | 0 | 0 | 1 | 1 | 1 | 0 | 0 | 1 | 1 | 3 | BLACK |
| | SYNC | 0 | 1 | 1 | 1 | 0 | 1 | 1 | 1 | 0 | 0 | 1 | 1 | 6 | SYNC |
| | BP | 1 | 1 | 1 | 0 | 1 | 1 | 1 | 0 | 0 | 0 | 1 | 1 | 2 | DARK GRAY |
| | SCAN | 1 | 1 | 1 | 0 | 1 | 1 | 1 | 0 | 1 | 0 | 1 | 1 | 2 | DARK GRAY |

EXPLANATION OF TERMS:

FP: THE 2.5 MICROSECOND "FRONT PORCH" WHICH PROCEDES THE HORIZONTAL SYNCHRONIZING PULSE FOR THE PURPOSE OF PRECONDITIONING THE SYNCHRONIZING CIRCUITS IN THE TV TO A "CONDITION" NOT DEPENDENT UPON VIDEO CONTENT OF THE WAVEFORM.

SYNC: THE 5.2 MICROSECOND HORIZONTAL SYNCHRONIZING PULSE.

BP: THE 2.6 MICROSECOND "BACK PORCH" INTERVAL WHICH FOLLOWS THE HORIZONTAL SYNCHRONIZING PULSE. FOR COLOR PATTERNS A COLOR BURST IS GENERATED DURING THIS INTERVAL.

SCAN: THE 53 MICROSECOND HORIZONTAL LINE SCANNING INTERVAL.

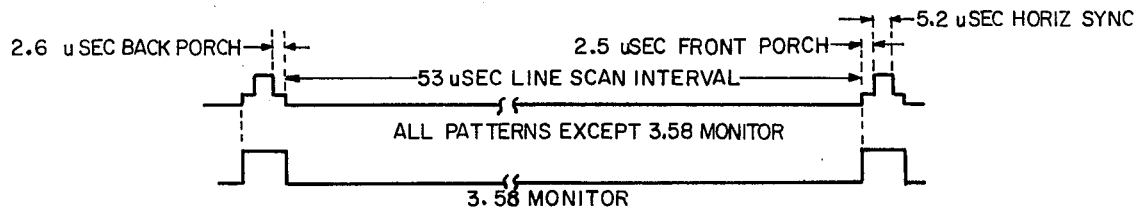

Fig_8

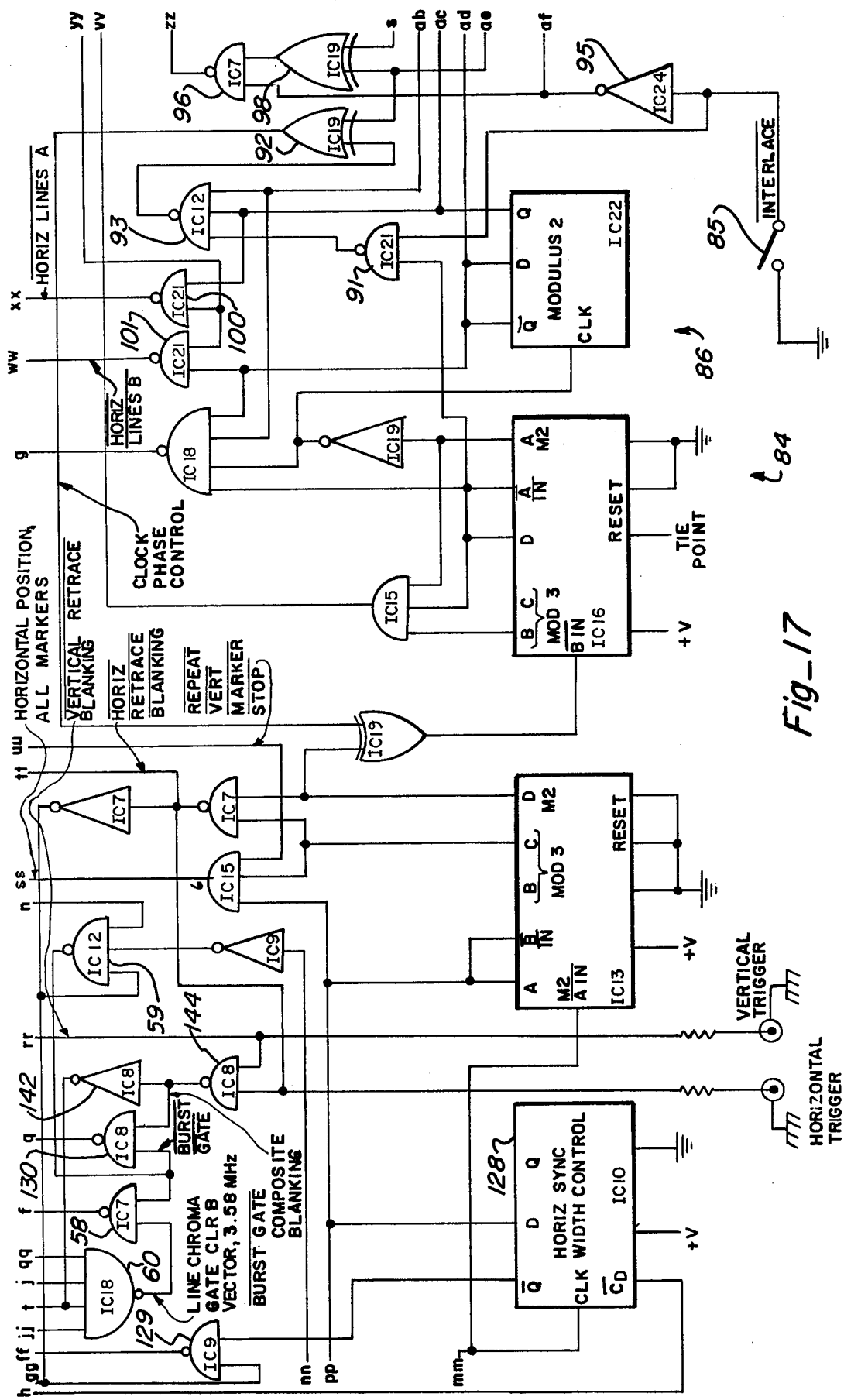
Fig_17

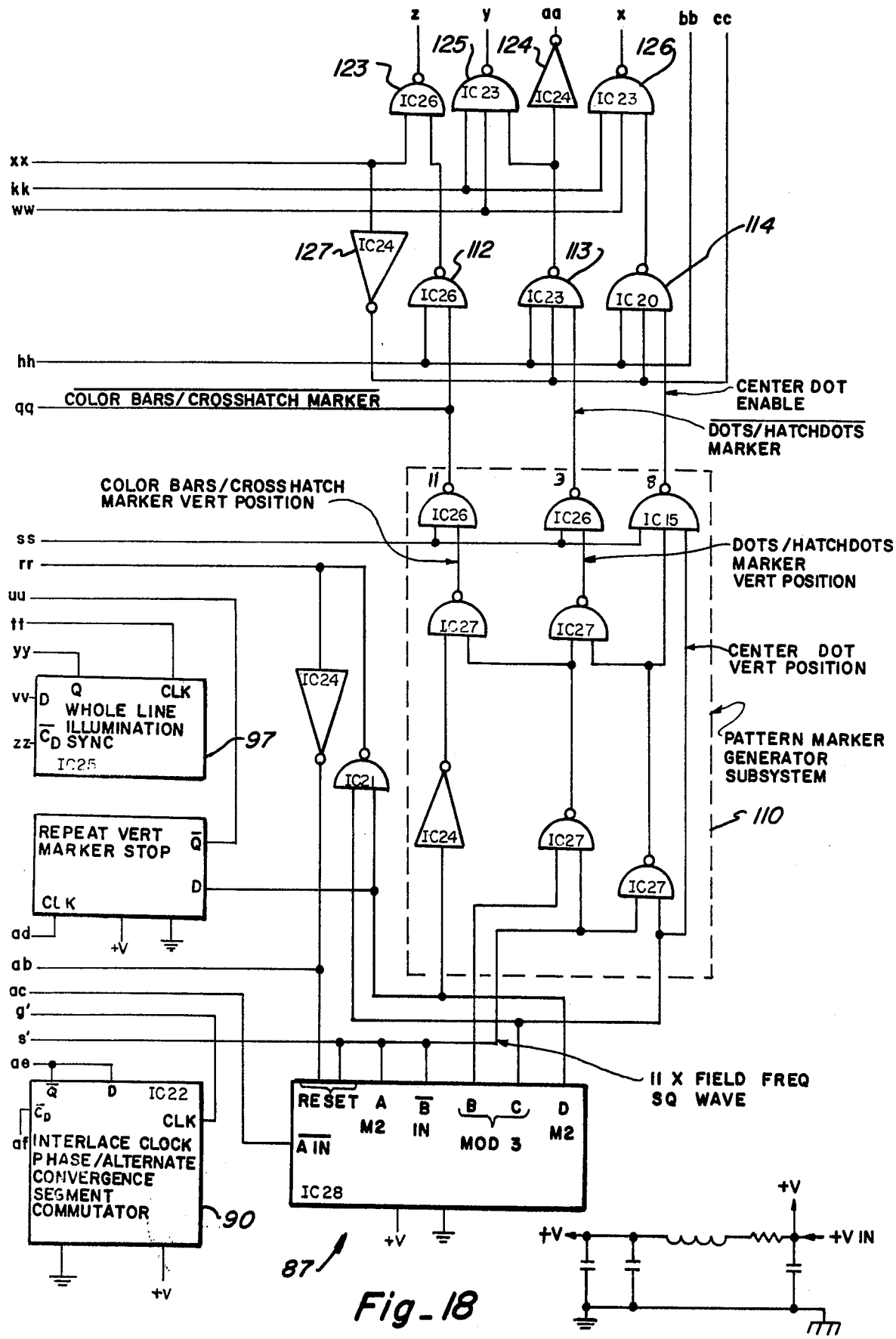
Fig_18

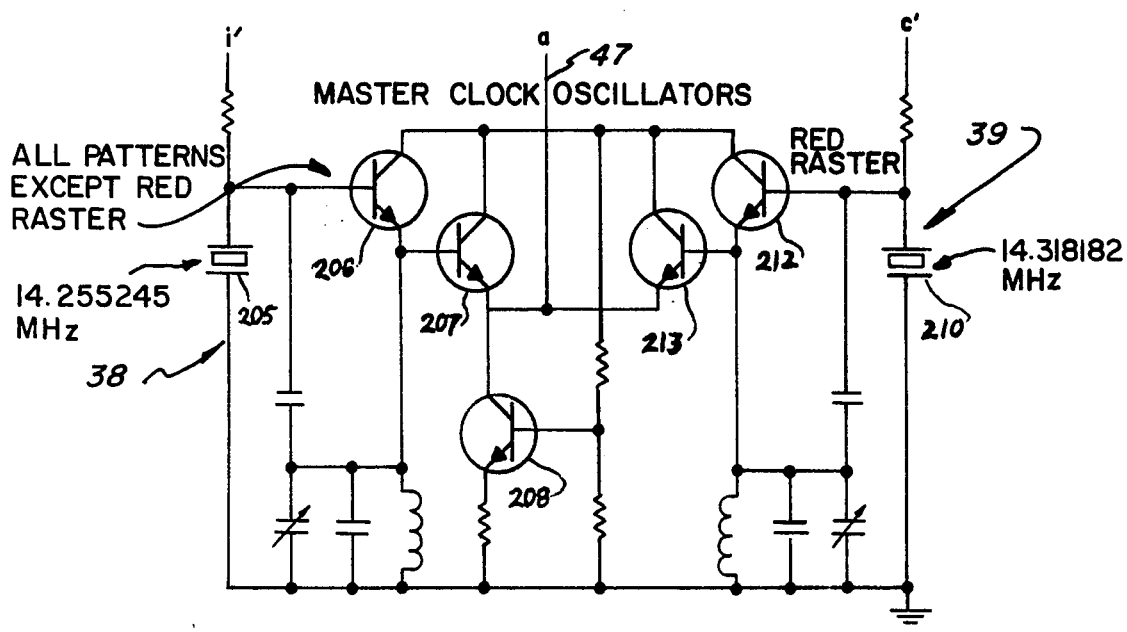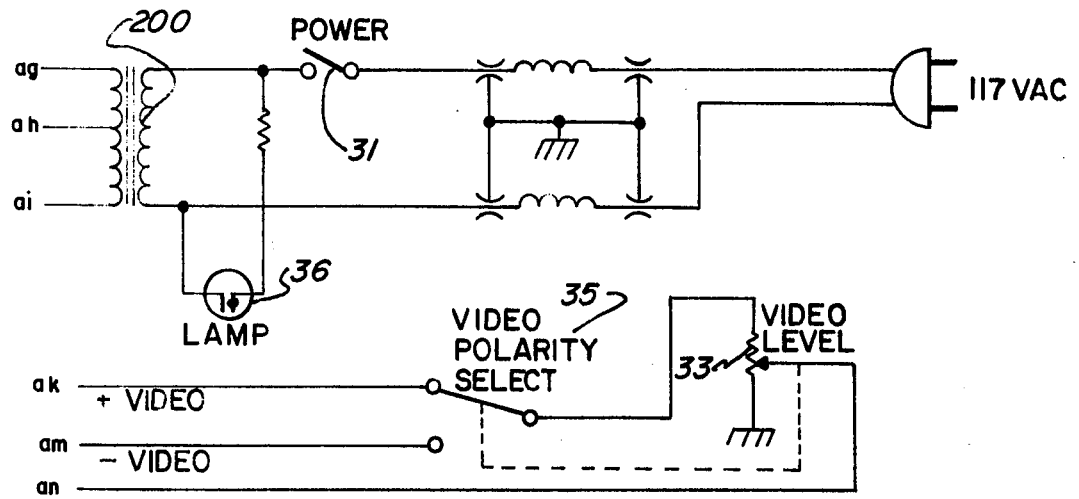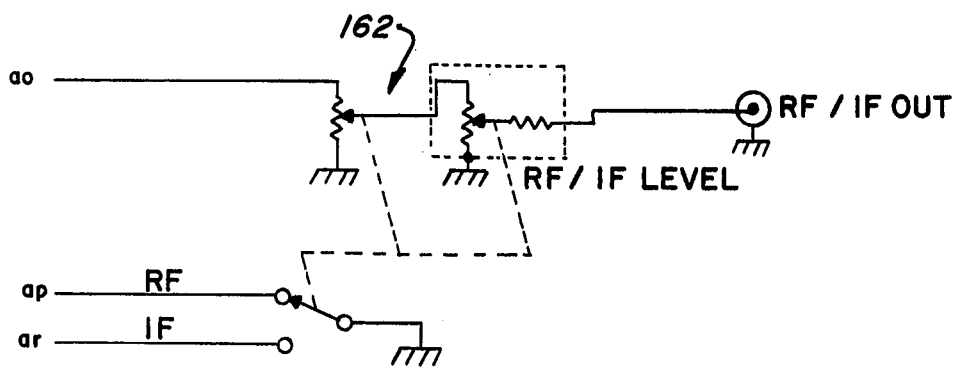
Fig_19

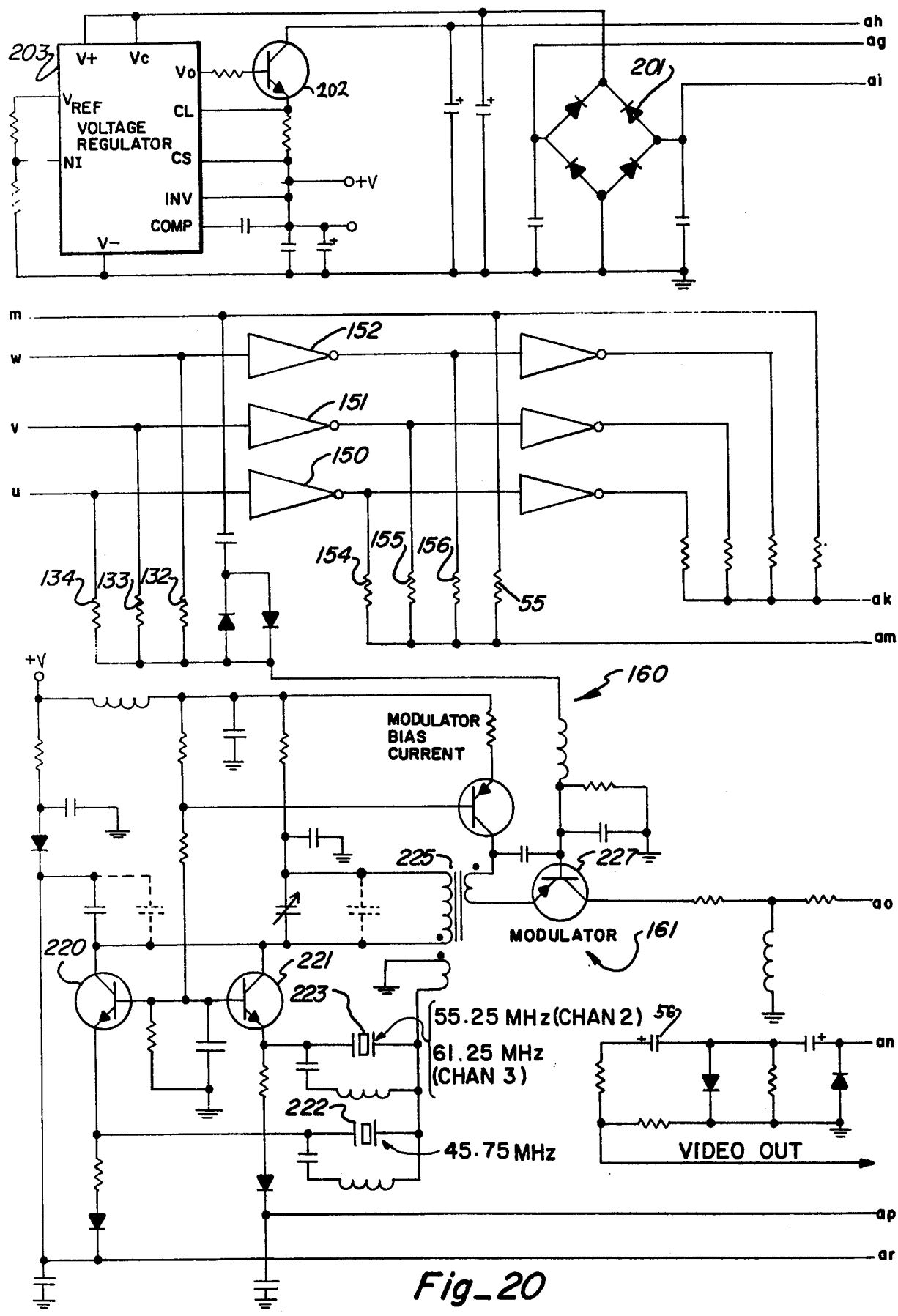
Fig_20

4,093,960

TEST SIGNAL GENERATING SYSTEM AND METHOD

RELATED APPLICATION

This application is a continuation of my copending U.S. patent application, Ser. No. 523,775, filed Nov. 14, 1974 and entitled "Test Signal Generating System and Method" now abandoned.

FIELD OF THE INVENTION

This invention relates to a test signal generating system and method and, more particularly, relates to a system and method for producing test signals useful in servicing TV receivers and the like.

BACKGROUND OF THE INVENTION

As electronic equipments have become more complicated, it has been necessary to provide units to facilitate, or in some cases make possible, the servicing of such electronic equipment to keep the same in good operational condition. This has been particularly true of electronic equipment used to receive TV signals, including the now common TV receiver and closed-circuit TV monitor, and the need for such service equipment has become even more acute with the increased use of color TV receivers and monitors.

Servicing of television receivers and closed-circuit TV monitors, and particularly color television receivers, often requires the use of special signal generating apparatus for producing stable test patterns such as a plurality of color bars each of different hue, a crosshatch pattern of white vertical and horizontal lines, or an orderly array of white dots to be displayed on the image-producing device of the TV receiver or closed-circuit monitor. These patterns are useful for checking and correctly adjusting linearity and pincushion distortions in scanning circuits, for checking and correctly adjusting operation of electron beam convergence, and color phasing and matrixing circuits in color television receivers.

While the need for more complex servicing equipment exists in view of the more complicated electronic equipment to be serviced, there obviously also exists a need to minimize such complexity to the extent possible in view of the seemingly ever increasing needed functions. To this end, it is desirable that servicing equipment be, and be maintained, lightweight, portable, reliable, versatile, and yet capable of simple operation.

Servicing equipment for TV receivers have been heretofore suggested and/or utilized. Included among such known equipment is equipment generally directed to producing test patterns for servicing TV receivers, and some said suggested equipment has included such features as digital circuitry, color bar pattern generation, and dot and crosshatch generation, as well as various frequency divider systems. Among patents showing one or more of these features are U.S. Pat. Nos. 3,019,289; 3,529,079; 3,250,853; 3,188,383; 2,836,717; 3,493,673; 3,430,067; 2,975,229; 3,634,612; 2,943,144; 3,586,755; 3,334,178; 2,824,225; and 2,683,187.

Such servicing equipment now suggested and/or utilized has not, however, proved to be completely successful at least in accomplishing all of many and diverse desired ends. For example, known servicing equipment, while providing test patterns, has not provided fully satisfactory patterns and/or has not produced the number of various patterns that might be needed. In addition, known serving equipment has not fully provided needed simplicity, versatility and/or reliability, and circuitry problems related to such equipments has not been eliminated or satisfactorily reduced in many instances.

Thus, even though much servicing equipment has been heretofore suggested and/or utilized, a need still existed for a system that could eliminate, or at least substantially reduce, many of the problems in equipment of this type.

SUMMARY OF THE INVENTION

This invention provides a lightweight and portable test signal generating system that is reliable, versatile, and simple to operate, said system being particularly well suited for servicing TV receivers and monitors including color equipment. This invention also provides a method for providing test signals, as well as a method for utilizing such test signals for servicing of TV receivers and the like. The system includes improved circuitry for superior performance with such circuitry requiring only a single enabled oscillator to provide both better offset carrier and sweep frequencies, and also providing outputs sufficient for producing heretofore unattainable test patterns and/or characteristics thereof.

It is therefore an object of this invention to provide an improved system and method for producing test signals suitable for servicing electronic equipment.

It is another object of this invention to provide an improved system and method for producing test signals to be utilized in servicing TV receivers and monitors.

It is still another object of this invention to provide an improved system for generating output signals suitable for causing test patterns to be produced for use in servicing TV receivers and the like.

It is yet another object of this invention to provide a system having improved circuitry utilizing a signal enabled oscillator for producing both offset carrier and sweep frequencies.

It is still another object of this invention to provide a system having a single enabled oscillator and novel countdown chain, as well as circuitry providing new and/or improved test patterns.

It is yet another object of this invention to provide an improved system providing a heretofore unavailable high video output signal suitable for eliminating signal distortion and reducing cost that would otherwise be characteristic of a video output amplifier.

It is still another object of this invention to provide a system that has improved versatility and immunity to obsolescence as well as providing output signals that produce stable output test patterns of superior quality.

It is yet another object of this invention to provide a system the versatility of which is enhanced by circuitry including a simple switching system to control test pattern generation that eliminates complicated, laborious and time-consuming procedures and techniques at least some of which could not heretofore be practically accomplished with a portable field unit.

It is another object of this invention to provide an improved system having a single master clock oscillator (operating at any given time) and two variable modulus countdown chains that are used to provide a common frequency source for all chroma, synchronizing, and gating frequencies to thus eliminate much of the distracting interference commonly generated on the image-producing device of TV receivers tested with known pattern generators. Such moving interference "beats" are eliminated in this invention by having both the offset carrier and color subcarrier frequencies in phase synchronism with the horizontal and vertical sweep frequencies. With respect to particular patterns, with VECTOR selected, for example, offset carrier and chroma subcarrier frequencies are produced which are in phase synchronism with integral harmonics (226 and 227, respectively) of the line scanning frequency (the use of integral harmonics provides vector patterns of maximum clarity through the elimination of "double leafing", this being also a valuable aid in the oscilloscope analysis of problems in the automatic frequency and phase control subsystem. An oscilloscope synchronized to the HORIZ TRIGGER output of the generator will provide a stable, noninterleaved display of the burst, line chroma, and/or color sync oscillator waveforms). In addition, with any black and white pattern or 3.58 MONITOR (a hybrid pattern) selected, the nominal chroma subcarrier frequency is an odd harmonic (455) of one-half the line-scanning frequency, with the offset carrier frequency being generated in phase synchronism with another odd harmonic (453) of one-half the line-scanning frequency (this helps through cancellation of interference beats to prevent lock-up of the chroma subcarrier oscillator and, thereby provides more normal operation of the color killer, improved sharpness of vertical line detail, and is a substantial aid in producing the 3.58 MONITOR pattern which requires for implementation that phase lock of the subcarrier oscillator be prevented). With COLOR BARS selected, offset carrier and chroma subcarrier frequencies are generated which are phase locked to odd harmonics (453 and 455, respectively) of one-half the line-scanning frequency (this provides cancellation of most interference beats and eliminates most of the distracting motion present in the color bar patterns produced on the image-reproducing devices of TV's being tested with known color bar pattern generators. "Beat" suppression also provided improved accuracy of phase correlation between the "burst" and the various color bars). Finally, with a PRIMARY COLOR RASTER selected, the chroma subcarrier frequency is generated in phase synchromism with an odd harmonic (455) of one-half the line-scanning frequency (this helps through the cancellation of beat frequencies to provide a smooth, interference-free RED RASTER).

It is still another object of this invention to provide an improved system capable of producing a PRIMARY COLOR RASTER test pattern (see FIG. 10) that enables a user to check and/or accurately adjust color purity at the flip of a switch without having to short any test points or misadjust and subsequently readjust the blue and green screen controls. In order to provide chroma video having the proper frequency and phase relationships for producing a red raster, this invention includes circuitry to establish a mode of operation embodying the use of a clock frequency which is the fourth harmonic of the chroma subcarrier frequency, as well as a digital phase shifter.

It is still another object of this invention to provide an improved system having circuitry providing centermarking of CROSSHATCH, HATCHDOTS, and DOTS patterns to enable the user to locate the center of the TV screen when only a portion of the screen is visible as could be the case, for example, when a "service" mirror is utilized as is conventional (this eliminates the need to repeatedly select different patterns while performing a series of interacting beam convergence adjustments).

It is another object of this invention to provide an improved system that includes circuitry for marking the sixth (blue) color bar of a test pattern through deleting a portion of the chroma while leaving the brightness pedestal unaffected (this eliminates the need for a "three bar" pattern and saves the user the time that would otherwise be required to repeatedly select it).

It is still another object of this invention to provide a system that includes circuitry providing a 3.58 MONITOR test pattern to enable the user, with a simple switch selection, to check and/or accurately adjust the free-running frequency of the color sync oscillator in a TV receiver being serviced (this eliminates the need to short a difficult-to-locate test point).

It is still another object of this invention to provide a system having a pair of variable modulus countdown chains, the second variable modulus countdown chain from line-to-field frequencies providing an optimum number of lines per field (this enables the user to check interlace accuracy on any TV and will provide stable test patterns on certain TV's, primarily those expected to be produced in the future, which will not tolerate a noninterlaced test signal).

It is yet another object of this invention to provide a system having a high-level weighted matrix digital summing technique employed for producing a low-impedance video output of superior quality (this is used in conjunction with a non-destructive type of protective device to prevent failures resulting from abuse).

With these and other objects in view, which will become apparent to one skilled in the art as the description proceeds, this invention resides in the novel construction, combination, and arrangement of parts substantially as hereinafter described, and more particularly defined by the appended claims, it being understood that such changes in the precise embodiment of the hereindisclosed invention are meant to be included as come within the scope of the claims.

BRIEF DESCRIPTION OF THE DRAWINGS

The accompanying drawings illustrate a complete embodiment of the invention according to the best mode so far devised for the practical application of the principles thereof, and in which:

FIG. 7 is a combining matrix video truth-table used in conjunction with the block diagram of FIGS. 2 through 4;

FIG. 8 is a combining matrix truth-table to be used in conjunction with the detailed block diagram of the preferred embodiment of this invention;

FIGS. 9 through 14 are typical pictorial representations showing particular test patterns not heretofore achieved by test signal generating equipment of the type contemplated; and FIGS. 15 through 20, taken together, form a detailed block diagram of the preferred embodiment of this invention.

DETAILED DESCRIPTION OF THE INVENTION

Figure 1:
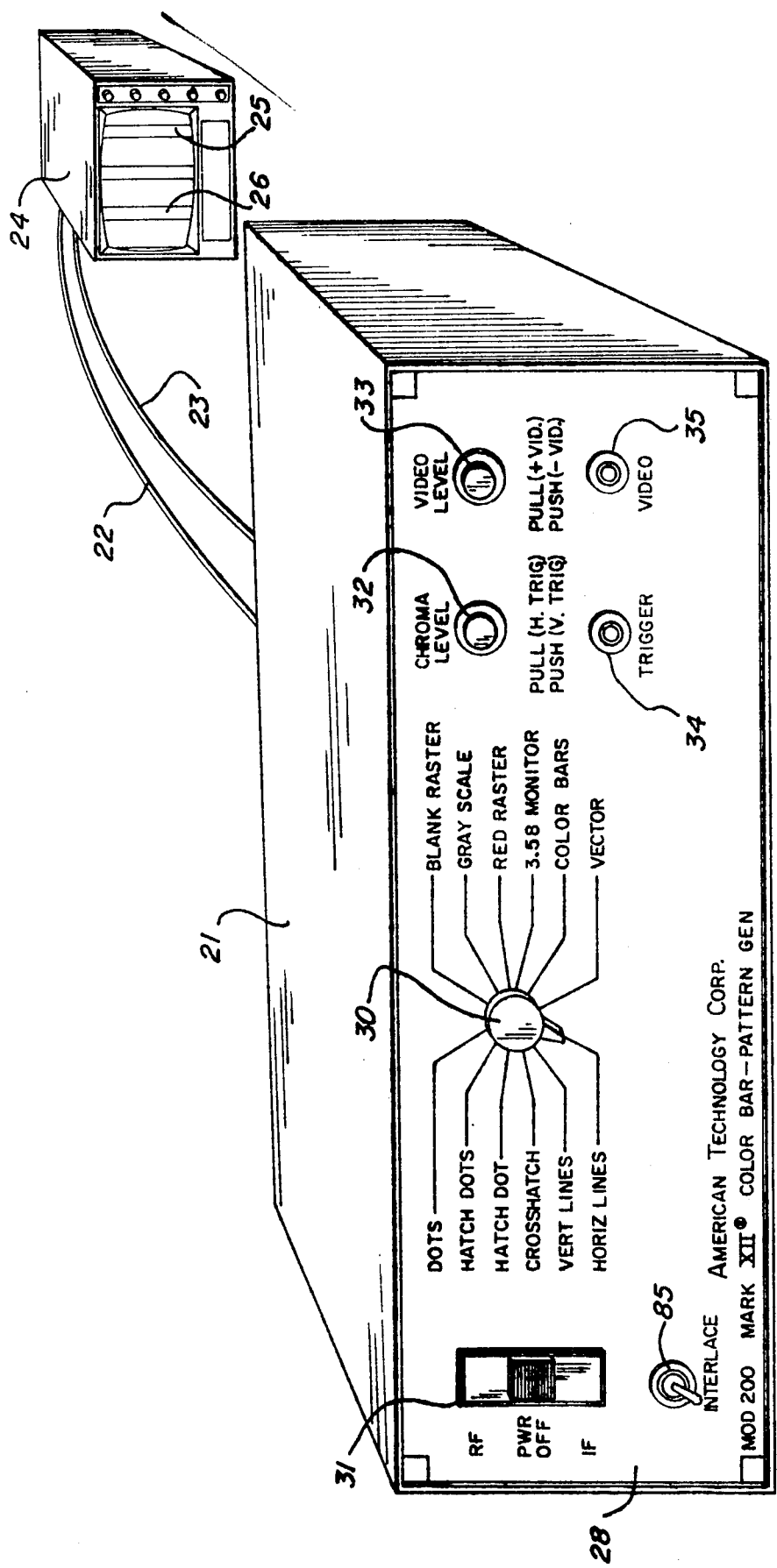
FIG. 1 is a perspective showing of the test signal generating system of this invention attached to a conventional TV receiver for servicing of the same.

Referring now to the drawings, FIG. 1 shows the test signal generating system 21 of this invention connected typically, as by leads 22 and 23, with a conventional TV receiver 24 having an image-producing device (TV tube) 25 upon which appears test patterns 26 under the control and by selection of signal generating system 21. As indicated in FIG. 1, signal generating system 21 has a plurality of controls at the front face 28 thereof. As shown, these switches include a single rotary switch 30 for selection of test patterns, a power and RF/IF switch 31, chroma and video level controls 32 and 33, respectively, and trigger and video control output jacks 34 and 35, respectively. In addition, an interlace selector switch 85 is also provided.

Figure 2:
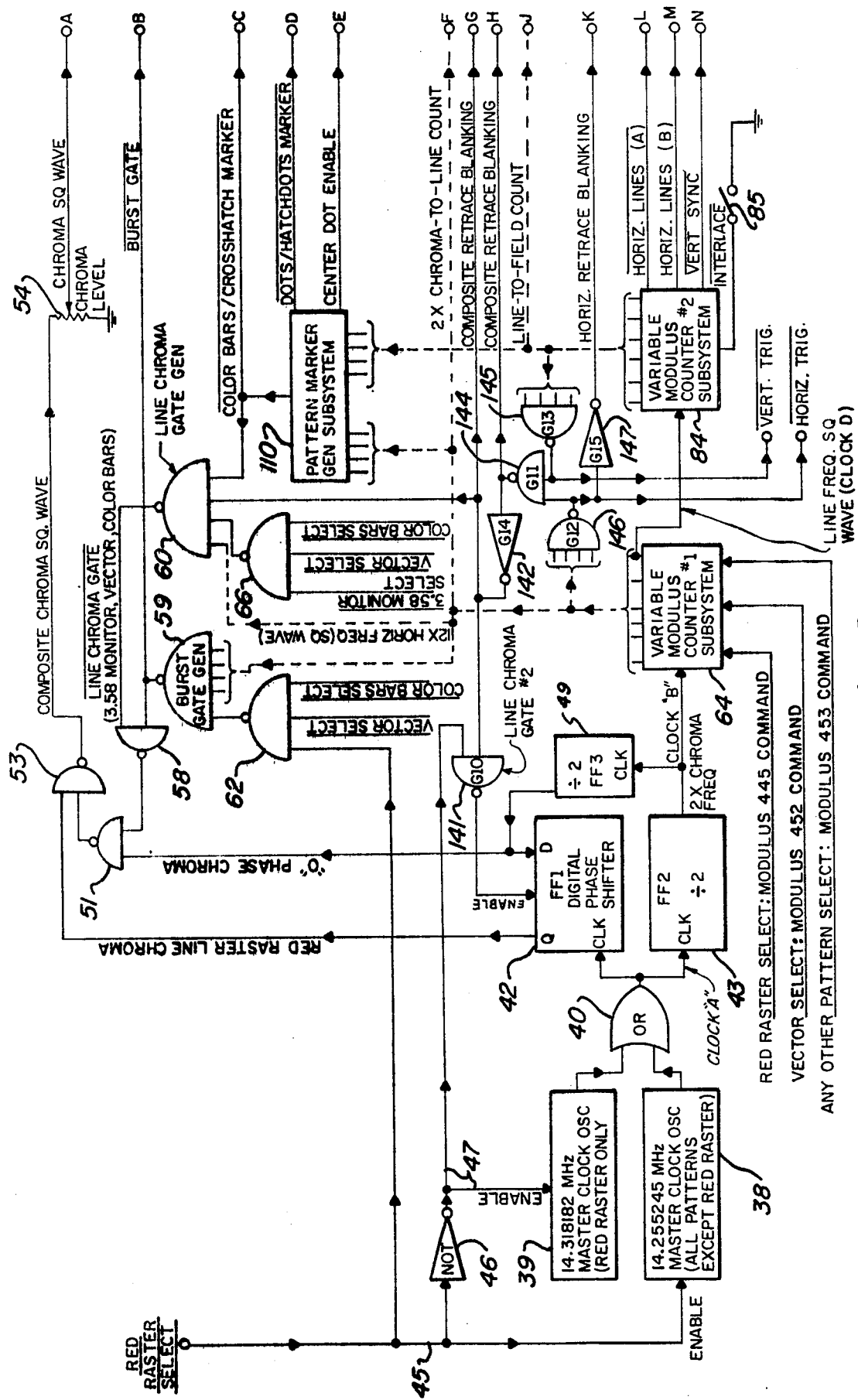
FIGS. 2 through 4, taken together, provide a functional simplified block diagram of the test signal generating system of this invention.
Figure 3:
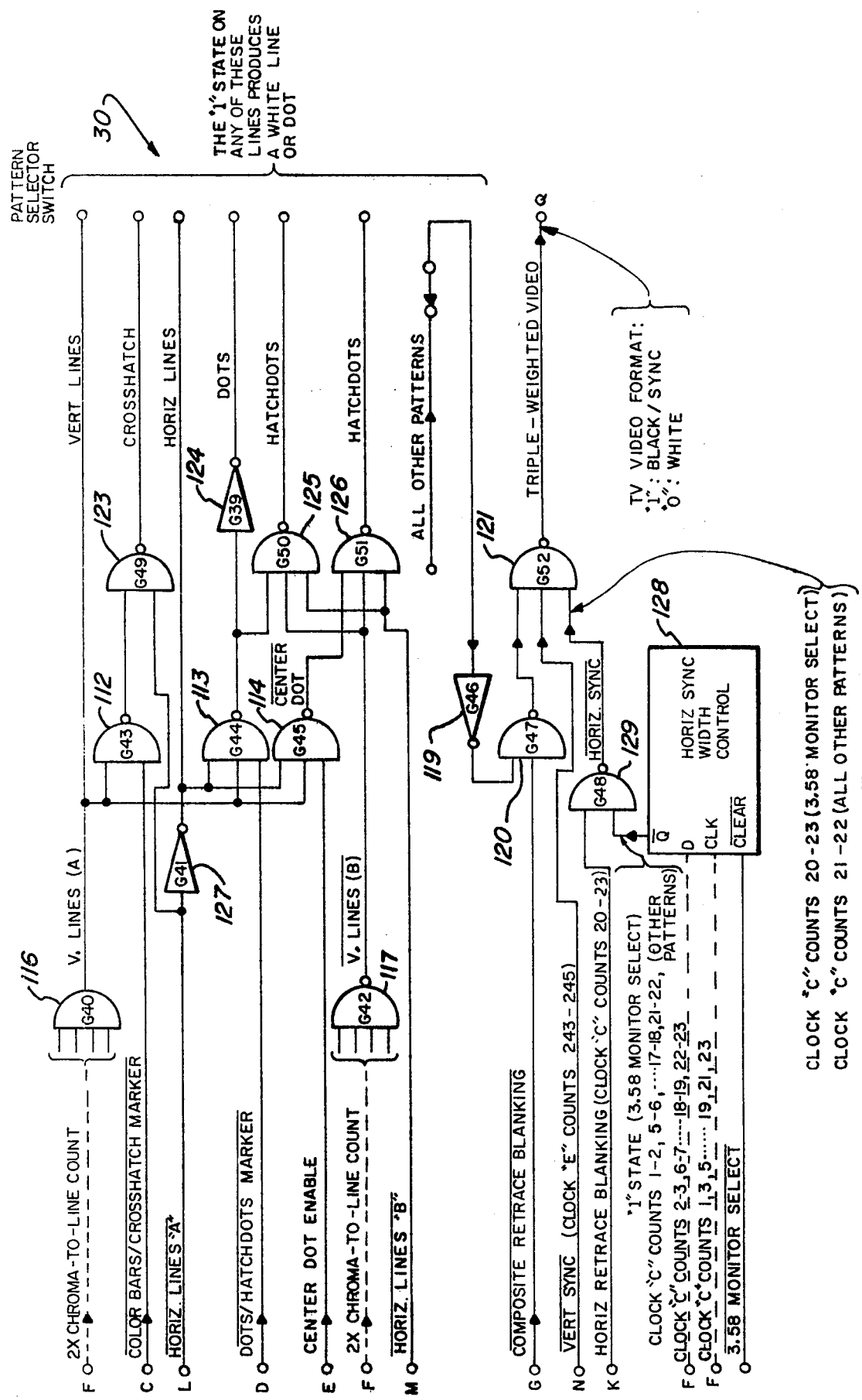
Figure 4:
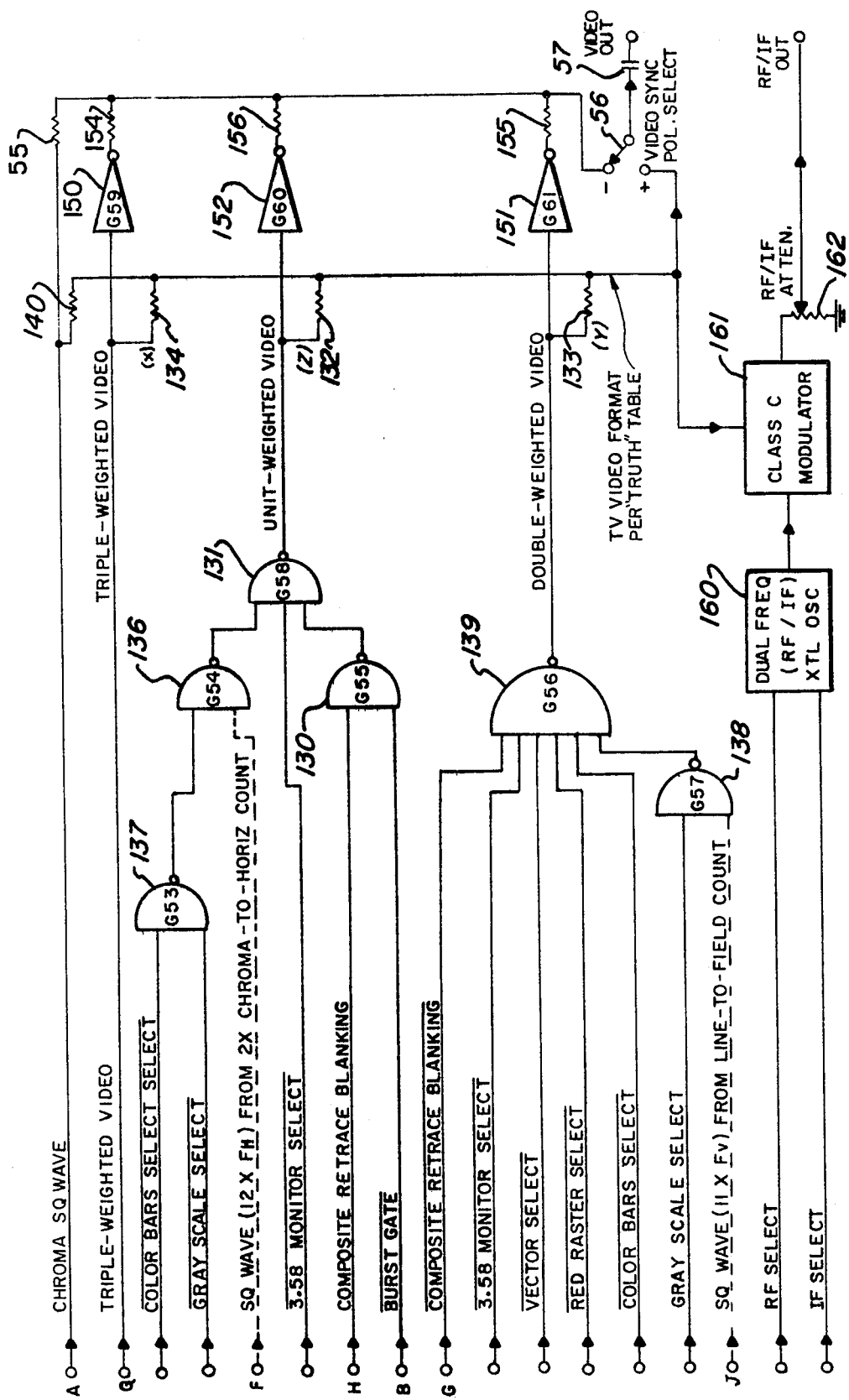

Referring now to the simplified block diagram of this invention as shown in FIGS. 2 through 4, this diagram constitutes an illustration of the basic theory of the invention, while FIGS. 15 through 20 are more detailed and constitute the preferred embodiment of this invention.

As shown in the drawings, the components, or elements, utilized in this invention are preferably solid state digital logic elements and the system of this invention can thus be packaged in a relatively small and thus portable unit 21.

As shown in FIG. 2, the system includes basically a single clock oscillator (operating at any given time) followed by a highly specialized countdown chain which provides the necessary frequency and phase correlated outputs. The outputs are processed through a plurality of summing and sorting gates and flip-flops to produce the required line, field, and chroma synchronizing functions, chroma and video signals, retrace blanking, pattern marking, and oscilloscope trigger outputs. In FIGS. 2 through 4, where the name of a function is indicated, it is implied to be a "1" level (standard logic) unless a line appears above the name indicating that it is a NOT (inverted) function. Where several outputs from a counter are bracketed together and are connected via a dashed line to one or more other blocks (AND gate, etc.), this is an indication that one or more of that counter's outputs are used by the respective block in order to provide an appropriate output for the task to be accomplished. There is no implication in this situation that the number of outputs shown from the counter or the number of inputs shown to the respective block is meant to be indicative of the actual number that are used. Thus, the counter and "block" may each consist of several sub-parts and one or more of these sub-parts may also serve a dual purpose as part of another subsystem, and only FIGS. 15 through 20 are meant to detail implementation of the preferred embodiment.

As shown in FIG. 2, master clock oscillator 38 provides a 14.255245 MHz output. This oscillator is ordinarily the only oscillator enabled except for the red raster test pattern. For this test pattern, oscillator 38 is disabled and master clock oscillator 39 is the only oscillator enabled, which oscillator provides an output of 14.318182 MHz.

Master clock oscillators 38 and 39 are thus included in the system but only one is enabled (turned on) under any given set of conditions. These oscillators are conventional crystal oscillators and are identical except that their operating (and crystal) frequencies are separated by four times the line-scanning frequency. The outputs from the oscillators are connected through a suitable coupling means (OR gate 40 as indicated in FIG. 2) in such a manner that either oscillator (whichever is enabled) will act as a suitable clock input to flip-flops 42 and 43, the former of which is a digital phase shifter and the latter of which is a divide-by-two ($\div 2$) circuit.

With a PRIMARY COLOR RASTER, such as RED RASTER, selected, a "1" appears at the output to oscillator 39 and a "0" appears at the input to oscillator 38, while the recrese is true for all other patterns. For this purpose, an ENABLE input is coupled to the oscillators, with oscillator 38 receiving the ENABLE input by means of lead 45, while oscillator 39 receives the ENABLE signal through lead 45, NOT gate 46 and lead 47. Thus, the provided oscillator output frequency for RED RASTER is 14.318182 MHz (clock A frequency as used herein) (four times the chroma subcarrier frequency used in TV broadcasts)), and the oscillator output frequency for all patterns except RED RASTER is 14.255245 MHz (four times the required offset carrier frequency). The use of a fourth harmonic of the chroma frequency is based upon requirements dictated by the digital phase shifter for producing RED RASTER, otherwise, the second harmonic of the offset carrier frequency would be suitable.

The output from flip-flop 43 is coupled to flip-flop 49 (a divide-by-two circuit) to form a simple two-stage asynchronous binary counter with the output from flip-flop 49 being a square wave whose frequency is one-fourth the enabled oscillator frequency. This chroma frequency is used as a color burst for the COLOR BARS, VECTOR and RED RASTER patterns and during line scanning for the COLOR BARS, VECTOR and 3.58 MONITOR patterns. As indicated in FIGS. 2 and 4, the output from flip-flop 49 is coupled through NAND gates 51 and 53, chroma level potentiometer 54 (controlled by chroma level control 32), resistor 55, video select 56 and capacitor 57 to provide video output.

A second input to NAND gate 51 is provided by the output from NAND gate 58, one input to which is supplied from burst gate generator (NAND gate) 59 and the other input to which is supplied from line chroma gate generator (NAND gate) 60. Burst gate generator 59 receives as one input the output from NAND gate 62 (which, in turn, receives inputs from RED RASTER SELECT on lead 45, VECTOR SELECT and COLOR BARS SELECT) and inputs from variable modulus counter 64. Line chroma gate generator 60 receives one input from NAND gate 66 (which, in turn, receives 3.58 MONITOR SELECT, VECTOR SELECT and COLOR BARS SELECT inputs), an input from variable modulus counter 64, and COLOR BARS/CROSSHATCH MARKER, and COMPOSITE RETRACE BLANKING inputs.

Although flip-flops 43 and 49 are part of a digital phase shifter incorporated into this system to provide phase shifted chroma for line scanning of the RED RASTER pattern, they also serve two additional purposes. A type D flip-flop was chosen for flip-flop 42 (the digital phase shifter), although it is not the only possible choice. The steering (Data) input to the type D flip-flop 42 is slaved to the "0" phase chroma output of flip-flop 49. After the receipt of each 14.318182 MHz clock "A"

pulse, the "Q" output of flip flop 42 updates (if required) to cause it to have the same state ("1" or "0") as the steering "D" input. Since flip-flop 43 and flip-flop 49 divide the clock frequency by four and since the "Q" output of flip-flop 42 lags its "D" input by one clock "A" cycle, it will be seen that a nominal 90° phase delay will exist between the outputs of flip-flop 49 and flip-flop 42. The total phase delay of importance for producing a red raster is the difference in phase which occurs at the two inputs of gate 53 since this is the point at which the signals are recombined. The propagation delay from gate 40 through flip-flop 43, flip-flop 49, and gate 51 to one input of gate 53 is greater than the corresponding delay from gate 40 through flip-flop 42 to the other input of gate 53. Any delay errors can be eliminated by adjustment of the TINT control on a TV receiver under test, but this is seldom required.

In order to provide the various chroma and video gating signals required for producing the various patterns, it is expedient to divide each scanning line into 20 equal parts plus an additional segment for the retrace period which is approximately equal to four of the visible segments. In order to produce attractive patterns with minimum levels of interference, to keep interference levels low enough to make the 3.58 MONITOR pattern practical, and to provide patterns with a maximum smoothness of appearance, it is desirable to provide phase lock of the offset carrier and color sync oscillator frequencies at odd harmonics of one-half the line-scanning frequency. In order to provide stable oscilloscope patterns when viewing the chroma frequencies with respect to the line-scanning frequency, to produce vector patterns free of double-leafing, and to provide a convenient means of evaluating TV receiver performance at 3.56 MHz, it is desirable to provide phase lock of the offset carrier and color sync oscillator frequencies at whole multiples of the line-scanning frequency. This invention incorporates a first variable modulus counter subsystem 64 which fulfills all these requirements.

Figure 5:
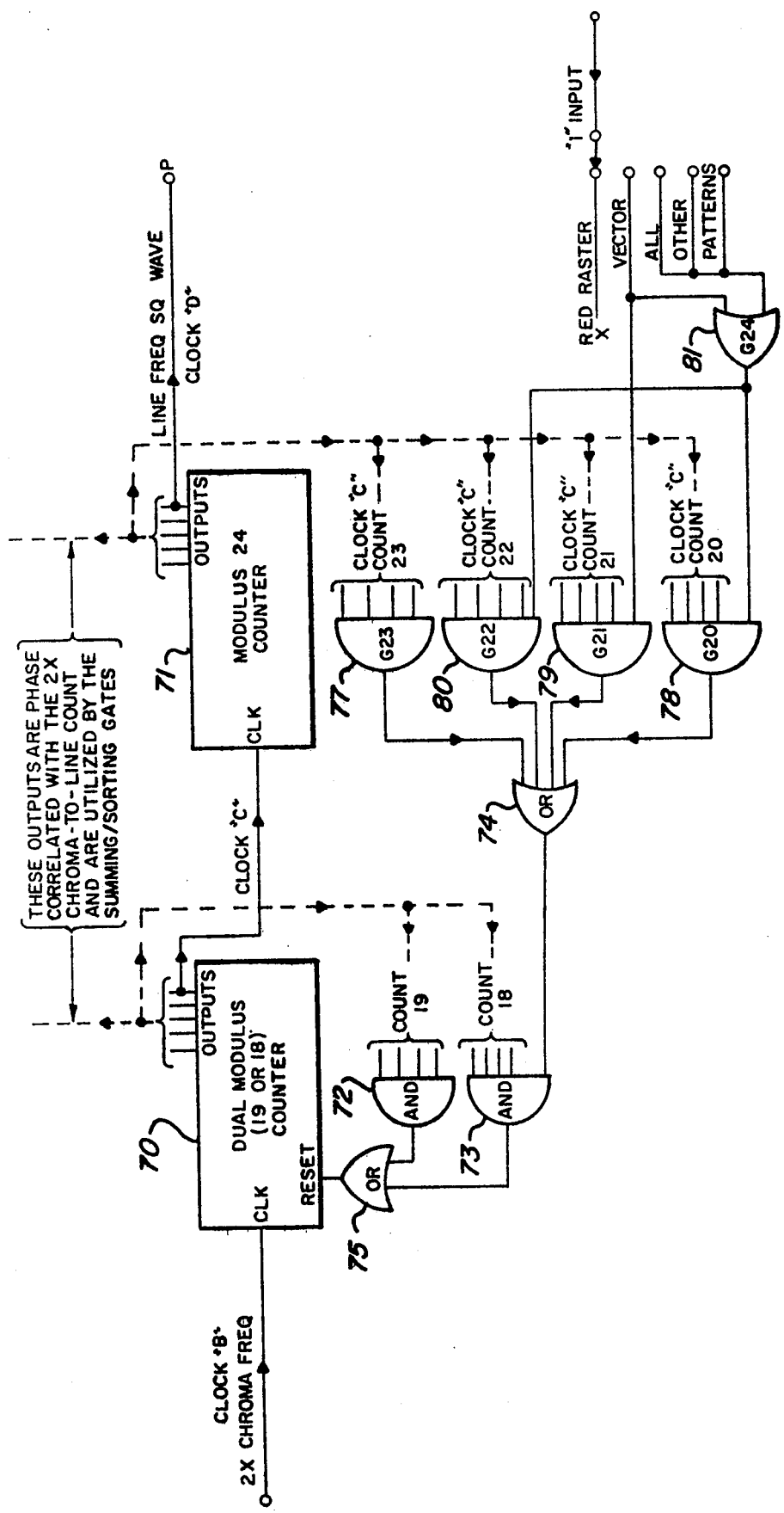
FIG. 5 is a block diagram of the first variable modulus counter subsystem shown in block form in FIG. 2.

With the VECTOR pattern selected, the modulus of counter 64 is 452 which provides phase synchronism of the offset carrier frequency and the color sync oscillator frequency with two adjacent harmonics (226 and 227, respectively) of the line-scanning frequency. For all pattern selections except VECTOR, the modulus of this counter subsystem is either 453 or 455 (both odd numbers). Since the variable modulus counter counts down from twice the chroma frequency (clock "B" as indicated in FIG. 2), the odd numbered modulus employed places the chroma frequency at an odd harmonic of one-half the line-scanning frequency thereby eliminating most interference beats that would otherwise occur between the chroma frequency and harmonics of the line frequency. Variable modulus counter 64 is shown in more detail in FIG. 5. This counter might best be referred to as a hybrid modulus counter in that it contains two counters 70 and 71, in cascade, one of which is caused to rapidly alternate between two modulos in response to selected outputs of the fixed modulus (modulus 24) counter 71. The dual modulus counter 70 is basically a modulus 24 counter ($\div 2$, $\div 3$, $\div 2$, $\div 2$ in cascade) with provision for accepting a reset command. Two AND gates 72 and 73, either of which can reset the counter, sense the occurrence of counts 18 and 19, respectively. If gate 73 is disabled by a "0" at the output of OR gate 74, the dual modulus counter counts up to 19 and is reset to zero by gate 72, the output of which is coupled through OR gate 75 to counter 70. If a "1" is present at the output of gate 74, gate 73 will be enabled and will shorten the count of the dual modulus counter 70 to 18. Gates 78 and 80 receive an input from OR gate 81 connected to receive inputs for VECTOR and all other patterns except RED RASTER.

Each time the dual modulus counter completes a cycle (either 19 or 18 counts of clock "B"), the modulus 24 counter 71 will receive a clock "C" input. For all patterns, AND gate 77 senses count 23 of clock "C" and enables gate 73 through OR gate 74 to reset dual modulus counter 70 at its count of 18. With RED RASTER selected, AND gates 78, 79 and 80 are disabled leaving only gate 77 enabled. The resulting composite modulo is $23 \times 19 + 1 \times 18 = 455$. If the VECTOR pattern is selected, gates 77, 78, 79 and 80 are all enabled. The count sequence of the dual modulus counter is thus shortened to 18 during counts 20, 21, 22 and 23, respectively, of the modulus 24 counter 71. The resulting composite modulus is, therefore, $20 \times 19 + 4 \times 18 = 452$. For all other pattern selections, gates 77, 78 and 80 are enabled and cause count sequences 20, 22 and 23, respectively, to be shortened to 18 counts. The composite modulus is thus $21 \times 19 + 3 \times 18 = 453$. Note that the requirement for 20 equal line segments is met in that the shortened count cycles occur during horizontal retrace.

Figure 6:
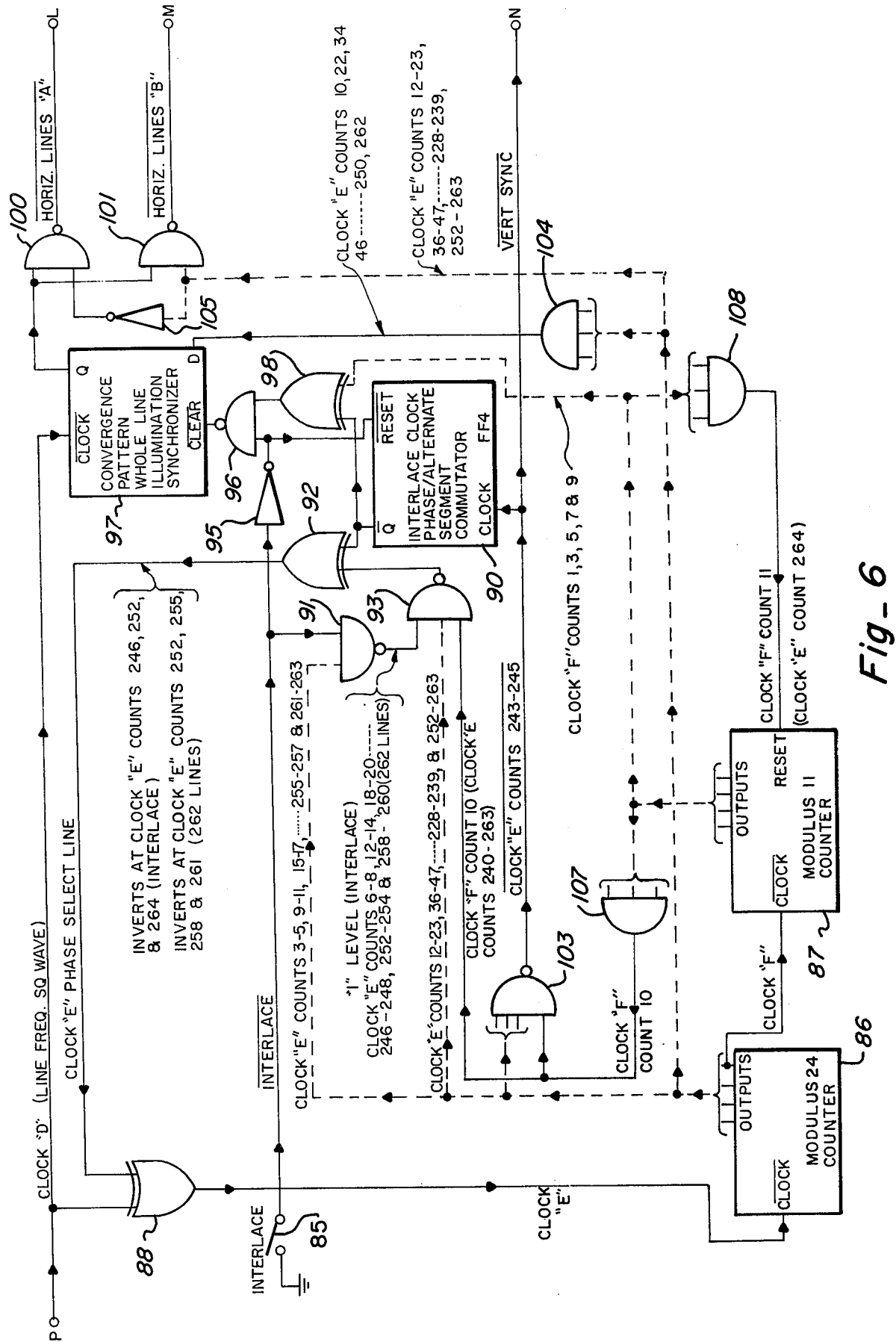
FIG. 6 is a block diagram of the second variable modulus counter subsystem shown in block form in FIG. 2.
Figure 15:
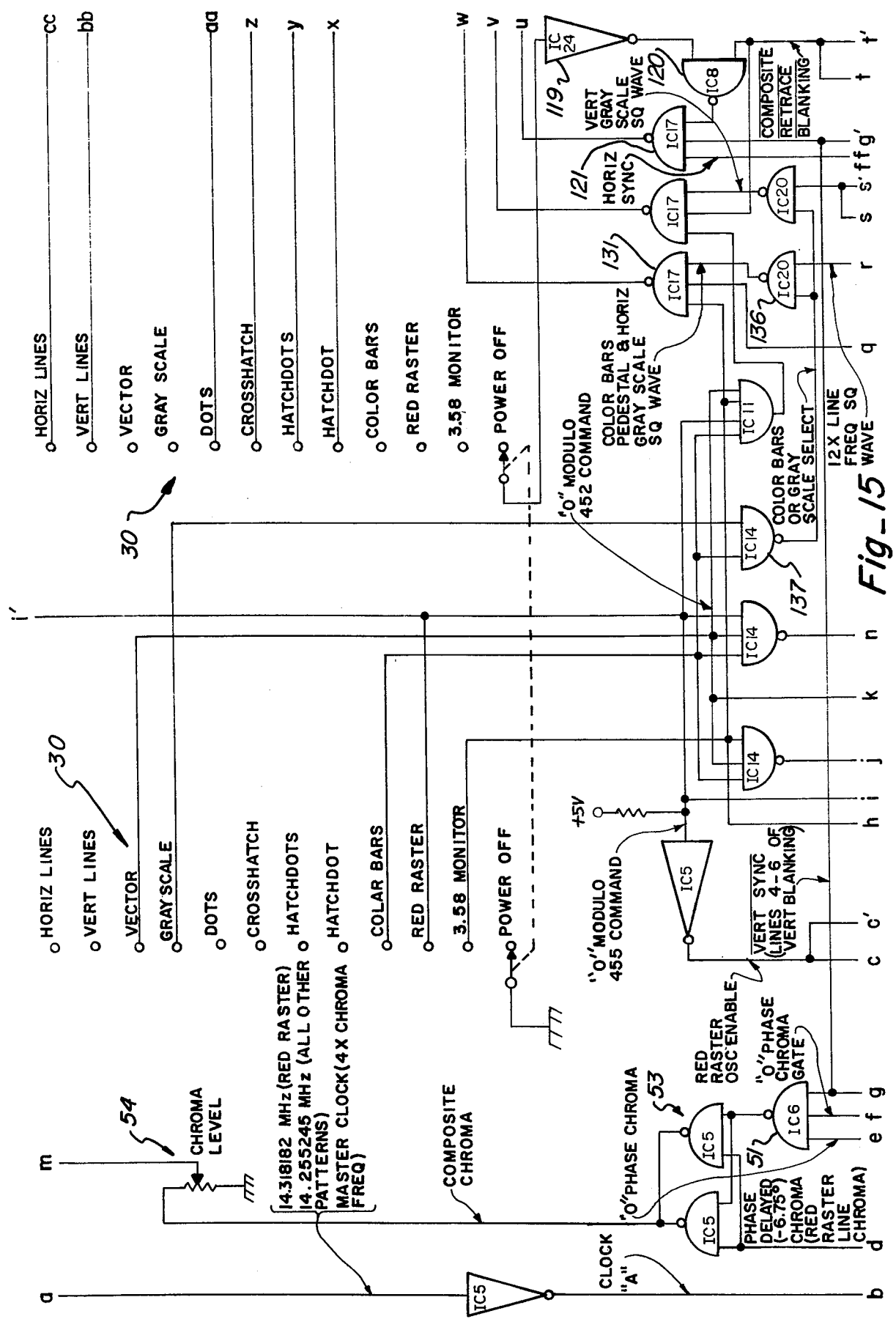
Figure 16:
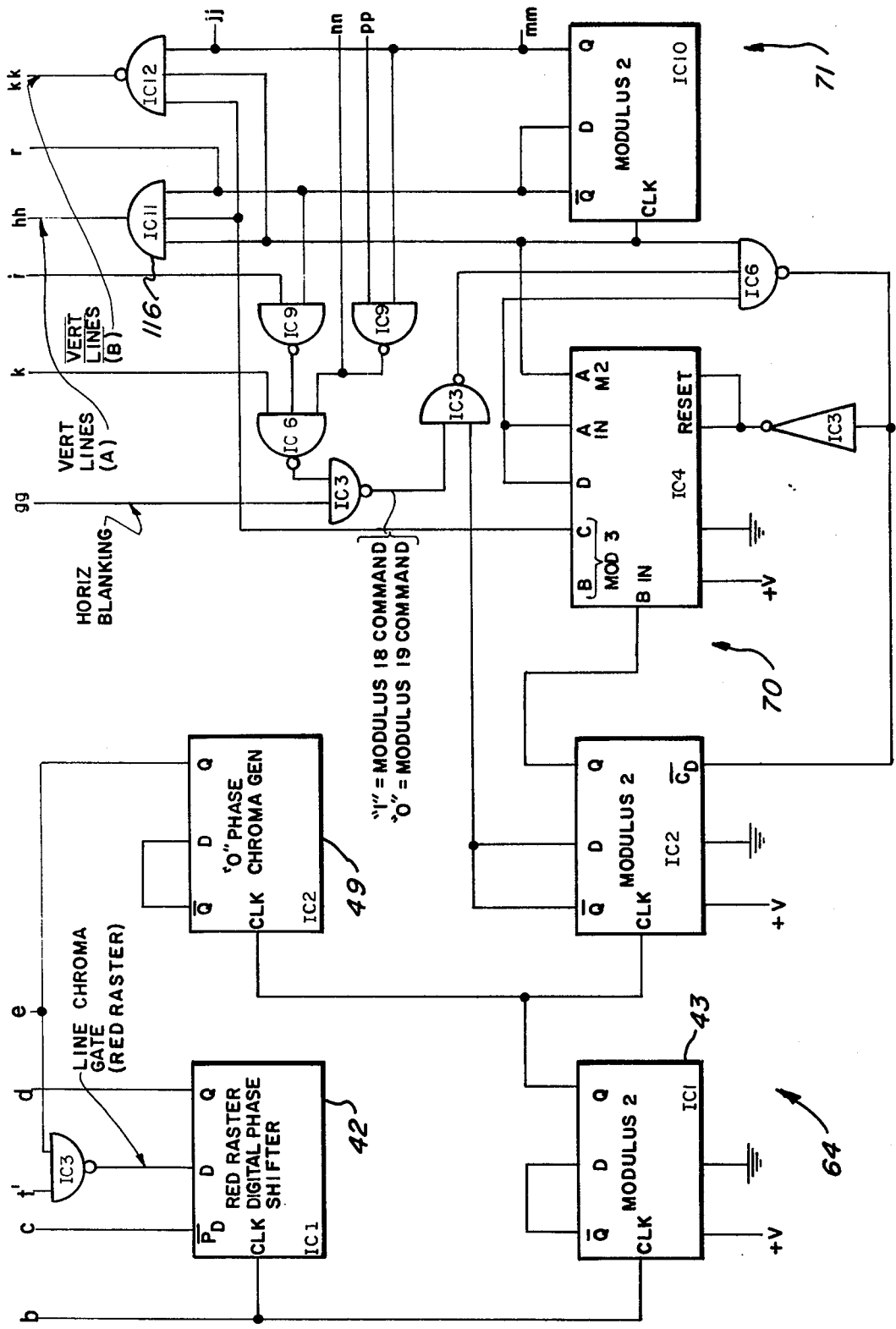

As indicated in FIG. 2, an output from variable modulus counter subsystem 64 is also coupled to a second variable modulus counter subsystem 84, shown in greater detail in FIG. 6.

TV broadcasts employ interlaced scanning (262.5 lines per field), but, until recently, TV receivers produced would synchronize equally well to a signal employing a whole number of lines per field/frame. Since it is more difficult and expensive to produce a test signal with interlaced scanning and since the convergence patterns produced with interlace are less pleasing in appearance, known color bar pattern generators in current production employ noninterlaced scanning. Certain recent models of TV receivers are, however, now being produced which are only semitolerant to noninterlaced scanning; and while these receivers can be tested (albeit marginally) with some known color bar pattern generators, other such generators cannot be so utilized. Moreover, it is anticipated that future TV receivers will probably be manufactured which will be completely intolerant of noninterlaced test signals.

It is further desirable that the field frequency be very nearly equal to the 60 Hz power line frequency in order to eliminate objectionable vertical motion of bends in vertical lines. Such slightly bent lines result from "hum" effects upon the horizontal synchronizing circuits of many TV receivers but are not objectionable enough to require repair and/or modification. It is further desirable that the vertical field be divided into 20 equal segments (as a basis for constructing the various patterns) plus an additional segment (approximately equal in duration to two of the visible segments) during vertical retrace.

In order to satisfy the above criteria, variable modulus counter 84, which is a unique, highly specialized variable modulus counter subsystem, has been provided in this invention which allows the user to select interlace (262.5 lines per field) or noninterlace (262 lines per field/frame). If INTERLACE is selected, a commutator switches at the frame frequency (one-half the field freqency) causing each field to be shortened by one-half line and causing alternate segments of the convergence patterns to be illuminated during the "front" and "back" fields, respectively. This, in conjunction with a whole-line illumination synchronizer overcomes most of the problems otherwise characteristic of convergence patterns using interlace. The choice of 262 lines for the noninterlaced field/frame selection is based upon the requirement to minimize field frequency offset from 60 Hz. In the preferred embodiment of this invention, this offset from the power line frequency is −0.1% with interlace selected (identical to a color TV broadcast) and +0.1% with 262 lines selected.

This second variable modulus counter 84 could also be described as a hybrid modulus counter since it contains counters within counters within an overall counter subsystem. The second variable modulus counter subsystem 84 is more complex than the first counter 64, however, in that it contains most of the basic elements of the first plus a clock advance (inversion) feature and other special elements to enable it to achieve the following combination of objectives:

1. Switch selection of interlaced or noninterlaced scanning (by means of switch 85).
2. Division of the field into 20 visible plus 2 retrace segments for use as basic building blocks for the various patterns to be produced.
3. Commutation of field segments in such a manner that segments 3, 4, 7, 8, 11, 12, 15, 16, 19 and 20 are illuminated on the "front" field with segments 1, 2, 5, 6, 9, 10, 13, 14, 17 and 18 being filled in on the "back" field. This minimizes the displeasing effects of flicker at the 30 Hz frame rate.
4. Illumination of whole lines on both "front" and "back" fields for convergence patterns. Note that, without special synchronization, two consecutive half lines would otherwise be illuminated on the "back" field portions of the convergence patterns for any interlaced system.

As shown in FIG. 6, counter system 84 includes a modulus 24 counter 86 that consists of four stages (÷3, ÷2, ÷2, ÷2 in cascade). Its output is supplied as the clock "F" input to the modulus 11 counter 87 which is basically a modulus 12 counter (÷2, ÷3, ÷2 in cascade) with reset capability. Neglecting clock inversions, the modulus for this counter is 11 × 24 = 264. This can be thought of as the "inner" modulus for dual modulus counter system 84. Note that the requirement for 20 equal field segments plus 2 retrace segments is achieved in that the final stage in the modulus 24 counter 86 is binary.

The clock input to this second variable modulus counter subsystem 84 (clock "D") is a very nearly symmetrical square wave whose frequency is the line-scanning frequency. Inverting this square wave clock signal by means of inverting (exclusive OR) gate 88 has the effect of advancing the count of all following stages by one-half a line-scanning interval. It follows that inverting the clock "E" signal with respect to the clock "D" signal once per field effectively reduces the modulus of the counter from 264 (its "inner" modulo) to 263.5. This is an interlaced signal but is not the standard 262.5 line interlace employed for commercial broadcast purposes. Inverting the clock "E" signal with respect to the clock "D" signal N times per field reduces the composite modulus of the counter from 264 to 264 minus N/2. It follows, therefore, that three clock inversions per field are required to produce a standard interlaced modulus of 262.5 and that four clock inversions are required to produce a 262 line noninterlaced field. If the required clock inversions are accomplished during the retrace (blanked) interval, no discontinuities will be generated during the visible portion of the test patterns.

Referring to FIG. 6, if the clock "E" phase select input to gate 88 (an EXCLUSIVE OR gate) is a "0", the clock "E" signal to the modulus 24 counter 86 has the same phase as the clock "D" (line frequency) square wave. If the clock "E" phase select input to gate 88 is a "1", however, the clock "E" signal produced is out of phase with the clock "D" signal.

If INTERLACE is selected, flip-flop 90 (the commutator flip-flop) is enabled (a "1" at its $\overline{\text{CLEAR}}$ input) and NAND gate 91 is disabled causing a "1" to appear at its output. The output from flip-flop 90 is coupled through exclusive OR gates 92 and 88 to invert clock "E" with respect to clock "D" at count 246 of clock "E". This occurs during vertical blanking/retrace in coincidence with the trailing edge of the vertical sync pulse. This causes clock "E" count 247 to begin in the center of line 246 (assuming a "front" field for simplicity). The subsequent counts of clock "E" (through 264) therefore do not correspond directly to lines (clock"D"). It can also be seen that, in a similar manner, the output from NAND gate 93 causes inversions of clock "E" with respect to clock "D" at clock "E" counts 252 and 264. With INTERLACE selected, the three clock inversions which occur during the retrace interval as described above result in a composite modulo of 264 minus 3/2 = 262.5.

If noninterlace (262 lines) is selected, flip-flop 90 (the commutator flip-flop) is disabled (a "0" at its $\overline{\text{RESET}}$ input) causing a "1" to appear at its $\overline{\text{Q}}$ output, and NAND gate 91 is enabled by a "1" from the INTERFACE selector switch. The output from NAND gate 93 thus causes inversions of clock "E" with respect to clock "D" at clock "E" counts 252, 255, 258 and 261. The composite modulus for variable modulus counter system 84 is, therefore, 264 minus 4/2 = 262.

With 262 lines (noninterlace) selected, it is desirable to reproduce all convergence pattern segments on each field since flicker is effectively eliminated by the 60 Hz repetition of the pattern. The "1" output from the open INTERLACE selector switch is therefore inverted twice by NOT gate 95 and NAND gate 96 in cascade and appears at the $\overline{\text{CLEAR}}$ input of the convergence pattern whole line illumination synchronizer 97. This allows this synchronizer flip-flop to respond to its D and $\overline{\text{CLOCK}}$ inputs without interruption.

During the visible portion of the field, clock "E" counts correspond directly to scanning lines. Referring to FIG. 6, it can be seen that the D input of the synchronizer goes to a "1" level at lines 10, 22, etc., and falls to a "0" level at the and of these lines. It can also be observed that clock "D" falls at the end of each line. Thus, the Q output of the synchronizer 97 is caused to rise to a "1" level at the beginning of lines 11, 23, etc., and to fall to a "0" level at the end of these respective lines. Twenty lines, equally spaced throughout the visible portion of the sweep, are thus allowed to brighten (subject to further gating, etc.) to produce convergence patterns (horizontal lines, crosshatch, dots, etc.). If INTERLACE is selected, gate 96 is enabled, and, as discussed previously, commutator 90 is also enabled and changes state once per field. The input to exclusive OR gate 98 from commutator 90 is a "1" throughout the visible portion of the "front" field. The other input to gate 98 is a "1" during clock "F" counts 1, 3, 5, 7 and 9 and is a "0" during clock "F"

counts 0, 2, 4, 6 and 8. A double inversion through gates 98 and 96 in cascade causes this same signal phase to appear at the $\overline{\text{CLEAR}}$ input of the synchronizer. The Q output of the synchronizer is thus a "1" during lines 35, 47, 83, 95, 131, 143, 179, 191, 227 and 239. Note that lines 35 and 47 correspond to clock "F" count 1, lines 83 and 95 correspond to clock "F" count 3, etc. Lines 11, 23, 59, 71, 107, 119, 155, 167, 203 and 215 remain dark during the "front" field for convergence patterns and are enabled on the "back" (Half-line) field instead. This results from the fact that the Q output of commutator 90 is a "0" during the visible portion of the "back" field, and gate 98 therefore does not invert its other input.

Whole lines are always illuminated regardless of whether the synchronizer must wait a whole line from the time it receives a new level ("0" or "1") at its D input ("front" field) or only a half line ("back" field) before clock "D" falls.

The Q output of the synchronizer 97 is supplied to respective inputs of NAND gates 100 and 101. The other inputs to these two gates are of opposite phase. This produces the basis for two sets of 10 horizontal lines (subject to further gating/processing) which are interleaved. With INTERLACE selected, alternate pairs of horizontal lines ("A" and "B") are brightened on the "front" field with the remaining pairs being brightened for the "back" field.

As also shown in FIG. 6, outputs from counter 86 are coupled to NAND gate 103 (the output of which is $\overline{\text{VERTICAL SYNC}}$), to AND gate 104 (the output of which is coupled to synchronizer 97), through NOT gate 105 to gate 100, and directly to gate 101. Outputs from modulus 11 counter 87 are coupled to AND gate 107 (the output of which is coupled to gate 93), gate 98, and AND gate 108 (the output of which is coupled back to counter 87 for reset).

Referring again to FIG. 2, pattern marker generator subsystem 110 is depicted as a single block. Subsystem 110 is composed of a group of summing and sorting gates and a flip-flop and is conventional. The gates and flip-flop included (not shown) receiver frequency and phase information from both the 2 × chroma-to-line countdown chain (i.e., from the first variable modulus counter 64) and the line-to-field countdown chain (i.e., from the second variable modulus counter 84). The outputs from this subsystem are blanking functions which blank the proper element or elements of the respective patterns to be marked. The same subsystem produces a center-dot-enable command which is used in generating the HATCHDOT pattern.

It can, therefore, be seen that the marker and enable signals generated by this subsystem 110 defines one or more unique portions of the raster and must, therefore, by synchronized in frequency and phase with respect to both the line and field synchronizing signals produced. The output from this subsystem 110 labeled "color bars/crosshatch marker" is coupled to gate 60 where it blanks the desired portions of the field chroma from the COLOR BARS, VECTOR and 3.58 MONITOR patterns (see FIGS. 9 and 11). It thus identifies the sixth color bar (180 electrical degrees from the color burst). There is no blanking of the brightness pedestal of the sixth color bar. The fact that the brightness and chroma pattern components are visible individually and simultaneously in a single pattern make the COLOR BARS pattern a very useful aid in accurately fine tuning the TV to the test instrument and in evaluating the accuracy of color registration produced by the TV under test.

This same output from the pattern marker generator subsystem is used to blank two portions of the brightness from the crosshatch pattern (one above center and the other below center). This blanking occurs at NAND gate 112 (see FIG. 3).

A full array of dots for either the DOTS pattern or the HATCHDOTS pattern would consist of a 10 × 10 matrix. The dots and hatchdots marker blanks two of these dots (the one immediately above and the one immediately below the center dot) leaving 98 dots to be displayed. Note that some may not be visible due to overscan. This blanking is introduced at NAND gate 113 (see FIG. 3).

The center-dot-enable functions is identical to the other marking functions in that it identifies a unique portion of the screen with respect to both horizontal and vertical scanning but differs in that it produces an enable function instead of a blanking (disable) function. It is used to enable only the center dot (of the 100 that would otherwise be produced) for use in the HATCHDOT pattern. This enable function is introduced at NAND gate 114 (see FIG. 3).

The video output section of this system combines digital logic signals in a weighted matrix in such a manner that maximum versatility is achieved in producing high-level, low-impedance outputs of either required polarity. The output and impedance levels achieved are near optimum for directly driving the video stages in a TV receiver or the 75 ohm coaxial input of a closed-circuit TV monitor. The TV video "truth" table set forth in FIG. 7 shows how these three digital inputs are weighted to produce the required brightness levels. The chroma signal is also summed with the other video components at this same junction, but its weighting is not an important consideration for analyzing the generation of brightness/blanking/sync levels.

As can be observed from the "truth" table in FIG. 7, the video components that are triple-weighted are those that produce a large change in the brightness level, i.e., black/white or black/sync. This triple-weighted function is generated in the gating and switching circuits shown in FIG. 3. The gating outputs for all convergence test patterns are generated simultaneously, but they are selected individually by the respective positions of pattern selector switch 30.

Two sets of vertical lines (A and B) are generated at AND gates 116 and 117 in response to inputs from the 2 × chroma-to-line countdown chain (the first variable modulus counter 64). The width of all vertical lines is controlled by a digital process with no line width adjustment being required or provided. The two sets of vertical lines (A and B) are offset from each other by one-twentieth of the visible portion of a line-scanning interval so that the lines of set A are exactly centered between the lines of set B and vice versa.

In the same manner, two sets of horizontal lines (A and B) are generated at NAND gates 100 and 101 (see FIG. 6) in response to inputs from the line-to-field countdown chain (which includes second variable modulus counter 84 and convergence pattern whole line illumination synchronizer 97). These sets of lines are offset from each other by one-twentieth of the visible portion of the field-scanning interval so that the lines of set A are exactly centered between the lines of set B and vice versa. The VERTICAL LINES pattern is the output of AND gate 116 (vertical lines A) selected by the pattern selector switch 30 and supplied to the triple-weighted video summing input through NOT gate 119 and NAND gates 120 and 121.

The CROSSHATCH pattern (see FIG. 12) is generated by "OR'ing" together in NAND gate 123 the vertical lines (A) and horizontal lines (A) patterns. Two segments of the vertical lines (A) pattern are blanked at NAND gate 112 for marking of the center of the screen; and the horizontal lines A output is coupled through NOT gate 127 to provide a horizontal lines output at switch 30 and at gates 113 and 114.

The DOTS pattern (see FIG. 14) is produced by "AND'ing" together at NAND gate 113 the vertical lines (A) pattern and the horizontal lines (A) pattern. The DOTS pattern output taken through NOT gate 124 illuminates the TV screen only at the intersections of the respective vertical lines and horizontal lines. Two dots (the ones immediately above and below the center dot) are blanked by the $\overline{\text{DOTS/HATCHDOTS}}$ marker input.

The HATCHDOTS pattern (see FIG. 13) is produced by "OR'ing" together at NAND gate 125 the $\overline{\text{DOTS}}$ pattern, the $\overline{\text{VERTICAL LINES (B)}}$ pattern, and the $\overline{\text{HORIZONTAL LINES (B)}}$ pattern. This produces a crosshatch pattern with a dot perfectly centered in each square except for the squares immediately above and below the center square. The HATCHDOT pattern is a cross hatch with a dot in the center of the center square. This single dot is generated at NAND gate 114 and OR'ed with the crosshatch at NAND gate 126. A "1" appearing at any of the switch segments in FIG. 3 produces a white pattern segment. This function is subordinated at NAND gate 120 to the $\overline{\text{COMPOSITE RETRACE BLANKING}}$ function. The output of NAND gate 120 is, in turn, subordinated at NAND gate 121 to both the $\overline{\text{VERTICLE SYNC}}$ and the $\overline{\text{HORIZONTAL SYNC}}$ signals.

As discussed previously, it is necessary to supress harmonics of the line frequency to a very low level in order to make the implementation of the 3.58 MONITOR pattern (see FIG. 11) practical. A technique used for this purpose is to widen the horizontal sync pulse to fill the entire retrace blanking interval when 3.58 MONITOR is selected. This is accomplished by supplying a 3.58 MONITOR SELECT input to the $\overline{\text{CLEAR}}$ input of the horizontal sync width control flip-flop 128 (see FIG. 3). This produces a fixed "1" level at the $\overline{Q}$ output of this flip-flop. The $\overline{\text{HORIZONTAL SYNC}}$ output of NAND gate 129, therefore, corresponds directly with the horizontal retrace blanking function (clock "C" counts 20-23).

With any pattern except 3.58 MONITOR selected, the horizontal sync width control flip-flop 128 responds to its D and CLOCK inputs causing its Q output to be a "1" during clock "C" counts 1-2, 5-6, . . . 17-18, and 21-22. Since clock "C" counts 21 and 22 fall within the horizontal retrace blanking interval (clock "C" counts 20-23), both inputs of NAND gate 129 are at the "1" level durng counts 21 and 22. For all pattern selections except 3.58 MONITOR, the $\overline{\text{HORIZONTAL SYNC}}$ occurs during clock "C" counts 21 and 22. Count 20 is a "front porch" and count 23 is a "back porch" which has a color burst added for certain patterns. This format very nearly approximates the respective format of a standard TV broadcast signal.

Unit-weighted video is produced at the output of NAND gate 131 (see FIG. 4) which receives input from NAND gate 130. The unit weighting results from the fact that this function is summed into the weighted video summing junction through resistor 132 as opposed to resistor 133 of one-half value with respect to resistor 132 or resistor 134 of one-third value with respect to resistor 132 (as is utilized for double-weighted and triple-weighted video, respectively), as shown in FIG. 4. As shown by the truth table in FIG. 7, a "1" at the output of gate 131 with zeros at (X) and (Y) produces a raster density equivalent to light gray (one-third of the black level). With COLOR BARS selected or with GRAY SCALE selected, the output of NAND gate 136 (receiving an input from NAND gate 137) is a square wave whose frequency (to a very close approximation) is twelve times the line-scanning frequency. This square wave is derived from the 2 × chroma-to-line countdown chain (variable modulus counter 64).

With COLOR BARS pattern selected, gate 136 produces the brightness pedestal for the color bars consisting of ten dark gray vertical bars interleaved with ten black spaces. Each brightness pedestal and each black space is one-twentieth of the visible portion of a line-scanning interval in width. Offset carrier chroma is gated into the video in synchronism with each of the dark gray brightness pedestal bars except for two segments of the sixth (marked) bar. The same square wave is used in conjunction with a similar (but double weighted) square wave from NAND gates 138 and 139 to produce the multi-density GRAY SCALE checkerboard pattern.

With the 3.58 MONITOR pattern selected, the output of gate 131 remains at the −1" level continuously. For all patterns, the output of gate 131 is at the "1" level during retrace blanking except that it is at the "0" level during the generation of a burst gate (COLOR BARS, VECTOR and RED RASTER patterns).

Double-weighted video is produced at the output of NAND gate 139 as shown in FIG. 4. The double weighting results from the fact that this function is summed into the video summing junction through a resistor 133 having one-half the value of resistor 132 and which has twice the conductivity of resistor 132. As shown by the truth table in FIG. 7, a "1" at the output of gate 139 with zeros at (X) and (Z) produces a raster density equivalent to dark gray (two-thirds of the black level). With GRAY SCALE selected, the output of gate 139 is a square wave whose frequency is approximately eleven times the field-scanning frequency. When this double-weighted output of gate 139 is summed into the video with the single-weighted square wave output of gate 121, all possible combinations ("0" + "0", "0" + "1", "1" + "0", and "1" +"1") occur during line and field scanning. This results in a multi-density checkerboard pattern (GRAY SCALE) with blocks of white, light gray, dark gray, and black being produced in an ordered array on the image-producing device of the TV. With 3.58 MONITOR, VECTOR, RED RASTER or COLOR BARS selected, the output of gate 139 is a "1" continuously. This output is a "1" for all patterns during retrace blanking. Resistors 132, 133 and 134 are connected with the chroma square wave signal input through resistor 140.

Chroma is gated on and summed into the video as required to produce the various patterns. NAND gate 59 (FIG. 2) produces a burst gate in synchronism with the back porch interval if RED RASTER, VECTOR or COLOR BARS is selected. There is no burst generated for the 3.58 MONITOR pattern although chroma is gated on during line scanning. This lack of a burst causes the color sync oscillator in the TV to free-run. Gate 60 generates the line-scanning chroma gate for the 3.58 MONITOR, VECTOR and COLOR BARS patterns. Note that the sixth bar of these patterns is marked by deleting the chroma from two segments of this bar. NAND gate 141 is the line-scanning chroma gate for the RED RASTER pattern. One input to gate 141 is COMPOSITE RETRACE BLANKING which is composite retrace blanking coupled through NOT gate 142 while the second input is supplied on lead 47. The input of NOT gate 142 is connected with the output of NAND gate 144, the inputs to which are $\overline{\text{VERTICAL TRIGGER}}$ and $\overline{\text{HORIZONTAL TRIGGER}}$ inputs connected with the output of NAND gates 145 and 146, respectively, the former of which is connected with counter system 84 and the latter of which is connected with counter system 64. The $\overline{\text{HORIZONTAL TRIGGER}}$ is also coupled through NOT gate 147 to provide horizontal retrace blanking.

The COLOR BARS and VECTOR patterns are gated "rainbow" patterns and are generated through the use of an offset carrier. The 3.563811 MHz "offset" carrier employed by this system is one-fourth the frequency of the 14.255245 MHz clock and is derived from it by a two-stage binary divider. This carrier is offset below the frequency of the color subcarrier oscillator by an amount exactly equal to the line-scanning frequency. It might conversely be said that the color sync oscillator is offset above the frequency of the "offset" carrier by an amount exactly equal to the line-scanning frequency since the color sync oscillator is slaved (phase locked) to the sum of the "offset" carrier and line-scanning frequency. Regardless of the "sense" of analysis used, it can be seen that the phase rotation between the color subcarrier frequency and the offset carrier frequency is a full 360° during the scanning plus retrace of a single line. The phase lock is accomplished by the AFPC (aromatic frequency and phase control) subsystem in the TV receiver and is updated on a sampling basis once during each horizontal retrace. Since the color sync oscillator is phase locked to the "offset" carrier during the burst/sampling interval, the two frequencies are in phase at this time. As stated above, their relative phases rotate at a rate of 360° per line and they are in phase at the beginning of the scanning of each line. It is evident, therefore, that an orderly and linear phase rotation occurs during the scanning of each line and that this same phase rotation profile repeats for all successive lines. This generates the familiar "rainbow" pattern. Actually, the offset carrier is square wave gated at intervals of one-twelfth of 360° (to a very close approximation) in order that the bars produced will represent 30, 60, 90, etc., electrical degrees of phase rotation and can, therefore, be identified in relation to their proper colors. The COLOR BARS pattern employs a brightness pedestal which is gated on in exact time synchronism with the chroma signal. This improves the appearance of the bars and provides a convenient means of evaluating the performance of the TV receiver with respect to its ability to produce good registration of the chroma and brightness components of the reproduced image. These patterns also employ a marker for use in easy identification of the sixth (blue) bar. This marker is provided by deleting two segments of the chroma signal while leaving the brightness pedestal undisturbed. Marking of the COLOR BARS pattern in this manner makes it additionally useful as an aid in accurately fine tuning the TV to the test signal generator since color and brightness components of the reproduced image can be viewed individually and simultaneously in a single test pattern.

The 3.58 MONITOR pattern enables the user to check and/or accurately adjust the free-running frequency of the color sync oscillator in the TV receiver being serviced without having to short a test point in the TV receiver. The AFPC test point is usually difficult and time consuming to locate. The basic implementation of this feature requires that the test signal generator supply a chroma carrier or subcarrier signal to the TV receiver during line scanning and that it not supply a color burst signal. A further requirement is that inteference (such as harmonics of the line-scanning frequency) be suppressed to a level which prevents the TV receiver being serviced from achieving phase lock of its color sync oscillator to any "pseudo" burst. With phase lock successfully defeated, the color sync oscillator in the TV receiver free-runs. The colors displayed upon the image reproducing device of the TV receiver will, therefore, float or produce an array of diagonal rainbows in accordance with the magnitude of error present in the free-running frequency of the color sync oscillator. The 3.58 MONITOR pattern in the preferred embodiment of this invention employs a chroma signal during line scanning which consists of a square wave gated offset carrier. Other chroma frequencies could be used, and the gating frequency is not critical or indeed necessary except for the requirement that the chroma be gated off during the interval when the TV receiver samples for a color burst. A variety of techniques and/or combinations of techniques are possible for reducing the interference to a tolerable level. The methods employed in the preferred embodiment of this invention for suppression of interfering frequencies during the burst sampling interval are described below:

1. Accurate phase locking of the chroma frequency employed at an odd harmonic of one-half the line-scanning frequency.
2. Accurate positioning of the nominal color subcarrier frequency at an odd harmonic of one-half the line-scanning frequency.
3. The use of a widened (twice normal width) horizontal sync pulse for the 3.58 MONITOR pattern. This suppresses the ringing that would otherwise occur following the horizontal sync pulse (during burst sampling) if a back porch were employed.
4. The use of a black level background during line scanning. This minimizes the ringing produced as a result of the leading edge of the horizontal sync pulse (since a voltage transition of minimum magnitude is employed).
5. The use of L-C filtering to prevent interference from being conducted via the power supply into the video output/matrixing circuits and the RF/IF oscillator.
6. The use of L-C filtering to reduce the sensitivity of the modulator to chroma frequencies and frequencies higher than chroma frequencies. An increased level of intended chroma signal is then applied to offset this loss.
7. A pair of silicon diodes and a capacitor connected in series with the chroma input to the modulator in a manner to minimize conduction of low-level signals.

As shown in FIG. 4, the triple-weighted video output, double-weighted video output and unit-weighted video output are coupled to switch 35 through NOT gates 150, 151 and 152, respectively, as well as resistors 154, 155 and 156, respectively, with resistors 154, 155 and 156 having values equal to that of resistors 134, 133, 132, respectively.

As also indicated in FIG. 4, a dual-frequency crystal oscillator 160 is employed in the preferred embodiment of this invention. This oscillator generates crystal-controlled RF (channel 2 or channel 3) or IF (47.25 MHz) as selected by a selector switch 31. The RF or IF signal thus generated is used to excite a class C modulator 161 which employs an automatic biasing scheme for achieving improved linearity and freedom from adjustments. The video-modulated RF/IF output thus obtained is delivered via a level adjusting control 162, and a 75 ohm coaxial cable to the TV receiver under test. If the test signal is to be introduced into the TV tuner via balanced 300 ohm terminals, a matching transformer is employed at the end of the coaxial cable.

A detailed block and schematic diagram of the preferred embodiment of this invention is shown in FIGS. 15 through 20. In addition, a truth table (FIG. 8) has been provided for analyzing the generation of the signals supplied to the video summing matrix.

As shown in FIGS. 15 through 20, power is conventionally supplied to the unit with power switch 31 and pilot lamp 36 being conventionally utilized to control application of power and to indicate application of said power. The supplied power is coupled to a conventional power supply that includes transformer 200, bridge circuit 201, transistor 202 and voltage regulator 203. As indicated in the drawings, the output from the voltage regulator supplies the necessary voltages as required for operation of the test signal generating system.

Master clock oscillators 38 and 39 are also shown in FIGS. 15 through 20 in greater detail. As shown, oscillator 38 includes a crystal 205, transistors 206, 207 and 208, and conventionally associated L, R and C components. In like manner, oscillator 39 includes a crystal 210, transistors 212 and 213, and associated conventional L, R and C components. The outputs from the master clock oscillators 38 and 39 are coupled to digital phase shifter 42 and divide-by-two (÷2) flip-flop 43, with the output from divide-by-two flip-flop 43 being coupled to divide-by-two (÷2) flip-flop 49 and to variable modulus counter subsystem 64. As shown in the drawings, variable modulus counter subsystem 64 includes dual modulus counter 70 and modulus 24 counter 71. Both counters 70 and 71 are shown in greater detail in FIGS. 15 through 20, but operate as indicated hereinabove with respect to FIG. 5.

An output from variable modulus counter subsystem 64 is coupled to variable modulus counter subsystem 84, which counter system includes modulus 24 counter 86 and modulus 11 counter 87. Counters 86 and 87 are shown in greater detail in FIGS. 15 through 20, but operate as indicated hereinabove with respect to FIG. 6.

Pattern marker generator subsystem 110 is likewise shown in more detail in FIGS. 15 through 20. As shown, IC 15-6 (that is, that section of IC 15 having an output at pin 6) is a part of the pattern marker generator subsystem 110 and this gate defines the horizontal position of all markers/dot-enable functions and, in addition, introduces the vertical marker stop function. The gates within the dotted rectangle defining pattern marker generation subsystem 110 (as shown in FIGS. 15 through 20) receive inputs from counter 87 and process these into functions which identify the unique vertical position of the respective blanking/enable signals. These signals are then combined at IC 26-11, IC 26-3 and IC 15-8 with the output of IC 15-6 which introduces the vertical position component. The outputs of IC 26-11, IC 26-3 and IC 15-8 therefore are blanking/enable signals, respectively, which define the required unique position or positions within the respective patterns in order to be marked or enabled. It might be noted that these enabling/enabled functions are synchronized to the field synchronizing signals.

The unit-weighted, double-weighted and triple-weighted video output signals are coupled from IC 17 terminals, as shown in FIGS. 15 through 20, and the truth table of FIG. 8 shows the binary and luminace values of such couplings.

The dual frequency (RF/IF) crystal oscillator 160 is also shown in more detail in FIGS. 15 through 20, as is class C modulator 161. As shown, the IF portion of oscillator 160 includes a transistor 220 while the RF portion of the oscillator includes transistor 221, which portions are connected to crystals 222 and 223, respectively. The output from crystal oscillator 160 is coupled through transformer 225 to modulator 161, which modulator includes transistor 227. The output from the modulator is then coupled through RF/IF attenuator 162 to the RF/IF output.

Additional components shown in the basic block diagram of FIGS. 2 through 4 have been identified in FIGS. 15 through 20 to aid in understanding the views as shown. The detailed overall embodiment of FIGS. 15 through 20 operates as indicated hereinabove with respect to FIGS. 2 through 4, and the components and line inputs are identified on the drawings as presented. In view of this, operation of the system and method of the invention as set forth in FIGS. 15 through 20 is thought to be self-evident.

In view of the foregoing, it can be seen that this invention provides a novel test signal generating system and method having improved features as well as features not heretofore known or suggested.

What is claimed is:

1. A test signal generating system, comprising:
an oscillator;
signal producing means having an input and an output, said signal producing means producing a plurality of output signals of predetermined composition at said output, said input being connected with said oscillator whereby said plurality of output signals are derived from a common oscillator source, and said signal producing means including countdown means connected with said single oscillator to facilitate generation of said plurality of output signals with said countdown means including a cascaded chain of countdown modulos so that said signal producing means can derive the line-scanning frequency from said oscillator; and
combining means for combining said plurality of output signals to produce a composite output signal, including chroma and line-scanning components that are derived from said common oscillator source and are in phase synchronism with respect to one another, for producing a predetermined test pattern on an image-forming display device connected with said test signal generating means.

2. The test signal generating system of claim 1 wherein the frequency of said chroma component is an integral mutiple of the frequency of said line-scanning component to establish at least one predetermined test condition.

3. The test signal generating system of claim 1 wherein the frequency of said chroma component is an odd harmonic of one-half the frequency of said line-scanning component to establish at least one predetermined test condition.

4. The test signal generating system of claim 1 wherein said system includes digital components, wherein said output signals are directly derived from said digital components, and wherein said combining means combines said output signals in a weighted matrix having sufficiently low impedance level but with said output signals having sufficiently high amplitude such that a high signal output is achieved to thereby substantially eliminate signal distortion.

5. The test signal generating system of claim 1 wherein said system includes output protection means for receiving the composite output signal to be coupled from said system, said output protection means including an output capacitor and diode means connected therewith whereby excess voltages are bypassed to prevent damage to said means providing said output signals.

6. The test signal generating system of claim 1 wherein said countdown means includes a cascaded chain of variable countdown modulos so that said signal producing means can derive the line-scanning frequency from said oscillator, and so that a field-scanning signal can be directly derived from said line-scanning frequency.

7. The test signal generating system of claim 1 wherein said cascaded chain of countdown modulos is a variable modulus counter subsystem, and wherein said system includes selecting means for selecting specific relationships between said chroma and line-scanning components.

8. The test signal generating system of claim 1 wherein said countdown means includes means for sensing a predetermined count on at least a later cascaded one of said countdown modulos and feeding the same forwardly to an earlier cascaded one of said countdown modulos so as to automatically alternate the modulus of said earlier cascaded countdown modulo between two or more modulos in synchronism with a multiple, of one-half the frequency of the line-scanning signal.

9. A test signal generating system for use in servicing TV receivers, said system comprising:
oscillator means;
signal producing means having an input connected with said oscillator means and an output producing a plurality of output signals of predetermined composition at said output;
combining means for combining said plurality of output signals to produce a composite output signal including chroma, line-scanning and field-scanning components for producing a predetermined test pattern on a TV receiver connected with said test signal generating means; and
output protection means for receiving the composite output signal to be coupled from said system, said output protection means including an output capacitor and diode means connected therewith whereby excess capacitor charging transients are bypassed to, and dissipated in a resistance to prevent damage to said means producing said output signals.

10. A test signal generating system for use in servicing TV receivers, said system comprising:
oscillator means;
signal producing means having an input connected with said oscillator means and an output producing a plurality of output signals of predetermined composition at said output; and
combining means including a weighted matrix for combining said plurality of output signals to produce a composite output signal including chroma, line-scanning and field-scanning components for producing a predetermined test pattern on a TV receiver connected with said test signal generating means, said plurality of output signals being combined at a matrix having sufficiently low impedance level but with said output signals having sufficiently high amplitude such that a high signal output is achieved to thereby substantially eliminate signal distortion.

11. A test signal generating system for use in servicing TV receivers, said system comprising:
signal producing means for producing a plurality of output signals of predetermined composition, said plurality of output signals including line-scanning and field-scanning synchronizing signals with said field-scanning signals being directly derived from an integral multiple, of said line-scanning signals, said signal producing means including a countdown chain having a cascaded chain of counters as frequency dividers constituting a variable modulus counter subsystem, said countdown chain having an input and an output;
combining means for combining said plurality of output signals to produce a composite output signal suitable for producing a predetermined test pattern on a TV receiver connected with said test signal generating system; and
an oscillator connected with the input of said countdown chain.

12. The test signal generating system of claim 11 wherein the frequency of said line-scanning signal produced by said signal producing means is an integral multiple of the frequency of said field-scanning signal produced by said signal producing means.

13. The test signal generating system of claim 11 wherein the frequency of said line-scanning signal produced by said signal producing means is an odd harmonic of one-half the frequency of said field-scanning signal produced by said signal producing means.

14. The test signal generating system of claim 11 wherein the output signal coupled from said oscillator is coupled to said variable modulus counter subsystem whereby the phase of said signal coupled from said oscillator may be altered with respect to the phase of the line-scanning signal in synchronism with a multiple, including 1, of the filed-scanning frequency in order to alter the effective modulus of the counter subsystem.

15. The test signal generating system of claim 11 wherein said countdown chain includes means for sensing a predetermined count on at least a later cascaded one of said frequency dividers and feeding the same forwardly to an earlier cascaded frequency divider so as to automatically alternate the modulus of the earlier cascaded frequency divider between two or more modulos in synchronism with a multiple, of one-half the frequency of the field-scanning signal.

16. A test signal generating system for use in servicing color TV receivers, said system comprising:

signal producing means for producing a plurality of output signals of predetermined composition, said plurality of output signals including line-scanning and field-scanning synchronizing signals, said signal producing means including a countdown chain having an input and an output connected with said signal producing means;

combining means for combining said plurality of output signals to produce a composite output signal suitable for producing a predetermined test pattern on a TV receiver connected with said test signal generating system, said test pattern being provided for the purpose of monitoring on the image-producing device of said TV receiver an indication of the magnitude of error in the free-running frequency of the color sync oscillator in said TV receiver, said test pattern being produced by including a suitable chroma signal in the composite output signal during the line-scanning interval, and said chroma signal being suppressed to a lower level by suitable means during the sampling interval when the AFPC circuit in said TV receiver being serviced is enabled; and an oscillator connected with the input of said countdown chain.

17. The test signal generating system of claim 16 wherein said suitable chroma signal includes harmonics of the line-scanning frequency, the oscillator and frequency divider which produce said line-scanning frequency, and wherein said harmonics have been suppressed to a greater degree during the sampling interval when the AFPC circuit in the TV receiver is enabled than during the line-scanning interval.

18. The test signal generating system of claim 16 wherein said countdown chain includes at least one variable modulus and wherein said oscillator is a single oscillator whereby said plurality of output signals produced by said signal producing means are derived from a single oscillator source.

19. A test signal generating system for use in servicing TV receivers, said system comprising:
oscillator means;
signal producing means having an input connected with said oscillator means and an output producing a plurality of output signals of predetermined composition, said plurality of output signals including line-scanning and field-scanning synchronizing signals and convergence pattern elements derived from said line-scanning and field-scanning signals; and
combining means for combining said plurality of output signals to produce a composite output signal for producing a predetermined test pattern on a TV display of a TV receiver and is connected to said test signal generating system, said combining means including marking means for providing a predetermined marking on said predetermined test pattern by deleting a predetermined portion of the test pattern produced on said TV display.

20. The test signal generating system of claim 19 wherein said marking means includes signal deletion means to cause deletion of a portion of the test pattern to thereby locate the center of said test pattern, said signal deletion means being generated in synchronism with said line-scanning and field-scanning signals.

21. The test signal generating system of claim 19 wherein said marking means includes signal deletion means to cause deletion of at least one segment of at least one color bar of a color bar test pattern to thereby aid in identifying a characteristic of said color bar.

22. The test signal generating system of claim 19 wherein said signal producing means produces output signals having a chroma component, and wherein said deletion of a predetermined portion of the test pattern produced on said TV display is achieved by deleting a predetermined portion of the chroma component.

23. A test signal generating system for use in servicing color TV receivers, said system comprising:
oscillator means;
signal producing means having an input connected with said oscillator means and an output producing a plurality of output signals of predetermined composition, said plurality of output signals including line-scanning and field-scanning synchronizing signals; and
combining means for combining said plurality of output signals to produce a composite output signal that causes a PRIMARY COLOR RASTER test pattern to be displayed on a TV display of a TV receiver connected with said test signal generating system.

24. The test signal generating system of claim 23 wherein said PRIMARY COLOR RASTER test pattern produced is a raster of uniform color produced by activating one color producing means of said TV receiver, said test pattern being produced to enable checking and adjusting of color purity of the TV display circuits without requiring shorting or misaligning of said TV display circuits in order to check color purity.

25. The test signal generating system of claim 23 wherein said PRIMARY COLOR RASTER test pattern produced is a raster of uniform color that is produced by including in the composite output signal a chroma component substantially close to a frequency of 3,579545 MHz to enable the tracking of the AFPC circuit in said TV receiver, wherein the phase of said chroma signal is substantially constant with respect to the phase of the color sync oscillator throughout substantially the entire line-scanning interval, and wherein a color burst of substantially the same frequency is supplied during the interval when the AFPC circuit in said TV receiver is enabled.

26. The test signal generating system of claim 23 wherein said PRIMARY COLOR RASTER test pattern produced is a raster of uniform color, wherein a chroma burst of a reference phase is produced during the sampling interval when the AFPC circuit of said TV receiver is enabled, wherein a chroma signal of the same frequency and any other phase is produced during the line-scanning interval, wherein the difference between the phases of said two signals is primarily established through the use of a frequency source higher than the chroma subcarrier frequency, wherein a chain of one or more frequency dividers is employed to produce said signals, wherein one or more of the elements of the frequency divider chain receives a steering input from another element of said chain while receiving an input from said oscillator means, wherein the result is to cause two or more elements of the divider chain to operate at the same frequency but with different phases even if one or more of these elements do not operate continuously, and wherein said two signals of different phase are combined by suitable combining means with said composite output signal.

27. A test signal generating system for use in servicing color TV receivers, said system comprising:

oscillator means;

signal producing means having an input connected with said oscillator means and an output producing a plurality of output signals of predetermined composition, said plurality of output signals including line-scanning and field-scanning synchronizing signals; and combining means for combining said plurality of output signals to produce a composite signal that causes a RED RASTER test pattern to be displayed on a TV display of a TV receiver connected with said test signal generating system.

28. The test signal generating system of claim 27 wherein said RED RASTER test pattern is a raster of uniform color, said test pattern being produced to enable checking and adjusting of color purity of the TV display circuits without requiring shorting or misaligning of said TV display circuits in order to check color purity.

29. The test signal generating system of claim 27 wherein said RED RASTER test pattern produced is a raster of uniform color that is produced by including in the composite output signal a chroma component substantially close to a frequency of 3.579545 MHz to enable tracking of the AFPC circuit in said TV receiver, wherein the phase of said chroma signal is substantially constant with respect to the phase of the color sync oscillator throughout substantially the entire line-scanning interval, and wherein a color burst of substantially the same frequency is supplied during the interval when the AFPC circuit in said TV receiver is enabled.

30. The test signal generating system of claim 27 wherein said RED RASTER test pattern produced is a raster of uniform color, wherein a chroma burst of a reference phase is produced during the sampling interval when the AFPC circuit of said TV receiver is enabled, wherein a chroma signal of the same frequency and any other phase is produced during the line-scanning interval, wherein the difference between the phases of said two signals is primarily established through the use of a frequency source higher than the chroma subcarrier frequency, wherein a chain of one or more frequency dividers is employed to produce said signals, wherein one or more of the elements of the frequency divider chain receives a steering input from another element of said chain while receiving an input from said oscillator means, wherein the result is to cause two or more elements of the divider chain to operate at the same frequency but with different phases even if one or more of these elements do not operate continuously, and wherein said two signals of different phase are combined by suitable combining means with said composite output signal.

31. A method for generating a test signal, said method comprising:

generating a single clock frequency output;

utilizing said clock output to produce a plurality of output digital signals having chroma and line-scanning components, and wherein said single clock frequency output generated has a specifically selected relationship to the chroma and line-scanning components; and utilizing variable modulus counters to generate a composite signal that includes line-scanning and field-scanning components with the frequency of said line-scanning component being an integral multiple of the frequency of said field-scanning component, said composite output signal being suitable for enabling a predetermined test pattern to be produced.

32. The method of generating a test signal of claim 31 wherein said method includes causing said plurality of output digital signals to be combined in a weighted matrix having sufficiently low impedance level but with said output signals having sufficiently high amplitude to produce a composite output signal to thereby produce a test pattern that is substantially free of signal distortion.

33. The method of generating a test signal of claim 31 wherein said method includes generating said single clock frequency output at an integral multiple of the frequency of both said chroma and line-scanning components.

34. The method of generating a test signal of claim 31 wherein said method includes generating said chroma frequency output at an odd harmonic of one-half the frequency of said line-scanning components.

35. A method for generating a test signal, said method comprising:

generating a single clock frequency output;

utilizing said clock output to produce a plurality of output digital signals having chroma and line-scanning components, wherein said single clock frequency output generated is an integral multiple of the chroma frequency and has a specifically selected relationship to the line-scanning components, and wherein said chroma frequency is generated at an integral multiple of the frequency of said line-scanning components; and combining said plurality of output signals to produce a composite output signal suitable for enabling a predetermined test pattern to be produced.

36. A method for generating a test signal, said method comprising:

generating a single clock frequency output;

utilizing said clock output to produce a plurality of output digital signals having chroma and line-scanning components, and wherein said single clock frequency output generated has a specifically selected relationship to the chroma and line-scanning components; and utilizing variable modulus counters to generate a composite signal that includes line-scanning and field-scanning components with the frequency of said line-scanning component being an odd harmonic of one-half the frequency of said field-scanning component, said composite output signal being suitable for enabling a predetermined test pattern to be produced.

37. A method for generting a test signal, said method comprising:

generating a single clock frequency output;

utilizing said clock output to produce a plurality of output digital signals having chroma and line-scanning components, wherein said single clock frequency output generated is an integral multiple of the chroma frequency and has a specifically selected relationship to the line-scanning components, and wherein said chroma frequency is generated at an odd harmonic of one-half the frequency of said line-scanning components; and combining said plurality of output signals to produce a composite output signal suitable for enabling a predetermined test pattern to be produced.

* * * * *

UNITED STATES PATENT OFFICE
CERTIFICATE OF CORRECTION

PATENT NO. : 4,093,960

DATED : June 6, 1978

INVENTOR(S) : Earl M. Estes et. al.

It is certified that error appears in the above-identified patent and that said Letters Patent are hereby corrected as shown below:

```
Column 2, line 37, "signal" should be ---single---.
Column 10, lines 34 and 35, "INTERFACE" should be
     ---INTERLACE---.
Column 11, line 11, "Q" should be ---Q̄---.
Column 12, line 16, "functions" should be ---function---.
Column 14, line 31, " -1" " should be ---"1"---.
Column 15, line 38, "aromatic" should be ---automatic---.
Column 19, line 46, claim 8, after "multiple" the comma
     should be deleted.
Column 20, lines 27 and 65, claims 11 and 15, after
     "multiple," the following should be included
     ---including 1,---.
Column 21, line 52, claim 19, after "signal" the following
     should be included ---suitable---.
Column 23, line 9, claim 27, after "composite" the
     following should be included ---output---.
Column 23, line 14, claim 28, after "pattern" the following
     should be included ---produced---.
```

Signed and Sealed this

Twentieth Day of February 1979

[SEAL]

Attest:

RUTH C. MASON
Attesting Officer

DONALD W. BANNER
Commissioner of Patents and Trademarks